(12) United States Patent
Kurono et al.

(10) Patent No.: US 6,502,001 B1
(45) Date of Patent: Dec. 31, 2002

(54) ELECTRONIC CONTROL UNIT HAVING REDUCED INTER-OBJECT MESSAGE MEMORY REQUIREMENTS FOR OBJECT-ORIENTED CONTROL PROGRAM

(75) Inventors: Takeshi Kurono, Handa (JP); Shigeru Kajioka, Kariya (JP); Kenji Shibata, Nagoya (JP)

(73) Assignee: Denso Corporation, Aichi (JP)

( * ) Notice: Subject to any disclaimer, the term of this patent is extended or adjusted under 35 U.S.C. 154(b) by 0 days.

(21) Appl. No.: 09/474,068

(22) Filed: Dec. 29, 1999

Related U.S. Application Data

(63) Continuation-in-part of application No. 09/104,967, filed on Jun. 26, 1998, now abandoned.

(30) Foreign Application Priority Data

Jul. 18, 1997 (JP) .............................................. 9-194627
Jan. 13, 1999 (JP) ............................................ 11-006574

(51) Int. Cl.$^7$ ................................................. G06F 9/44
(52) U.S. Cl. ..................................... 700/86; 707/103 Y
(58) Field of Search ........................... 700/2, 9, 71, 18, 700/86, 87; 701/101–104; 707/103 RY

(56) References Cited

U.S. PATENT DOCUMENTS 6,259,984 B1 * 7/2001 Kanzaki et al. ............... 701/51

FOREIGN PATENT DOCUMENTS

| EP | 0 892 342 A2 | 1/1999 |
| EP | 1022657 A2 * | 7/2000 |

* cited by examiner

*Primary Examiner*—Paul P. Gordon
(74) *Attorney, Agent, or Firm*—Nixon Vanderhye PC

(57) ABSTRACT

An electronic control unit that can execute object-oriented program processing without consuming much memory. When a message is dispatched due to execution of an object method, that message is stored (queued) in an object message holding part. At the point in time when execution of an object method finishes, message delivery processing is executed. If a message has been stored in the object message holding part, the number of queuing messages is counted, the message stored first is read out, and a shift is made to execution of the method of the object that is the output destination of that message. As a result, only messages need to be stored, and the amount of stored information, and thus the amount of memory required to store the information, is small.

42 Claims, 22 Drawing Sheets

FIG. 4

| OID \ MID | 1 | 2 | 3 | ------ | m |
|---|---|---|---|---|---|
| 1 | A00 | A01 | A02 | ------ | A0m |
| 2 | A10 | A11 | A12 | ------ | A1m |
| 3 | A20 | A21 | A22 | ------ | A2m |
| ⋮ | ⋮ | ⋮ | ⋮ | ------ | ⋮ |
| n | An0 | An1 | An2 | ------ | Anm |

FIG. 5A

| MEMORY ADDRESS | 0000 |
|---|---|
| POINTER | 0001 |
| OID | |
| MID | |
| ARGUMENT | |

FIG. 5B

| MEMORY ADDRESS | 0000 | 0001 | 0002 | 0003 | 0004 |
|---|---|---|---|---|---|
| POINTER | 0001 | 0002 | 0003 | 0004 | NULL |
| OID | | | | | |
| MID | | | | | |
| ARGUMENT | | | | | |

FIG. 16

| OBJECT | METHOD | OID | MID | ADDRESS |
|---|---|---|---|---|
| ISC | IDLE THROTTLE SETTING START REQUEST | 1 | 2 | A12 |
| ISC | WATER TEMP. ACQ. RESPONSE | 1 | 3 | A13 |
| ISC | ENGINE SPEED ACQ. RESPONSE | 1 | 4 | A14 |
| WATER TEMP. SENSOR | WATER TEMP. ACQ. REQUEST | 2 | 1 | A21 |
| WATER TEMP. SENSOR | WATER TEMP. A/D VALUE ACQ. RESPONSE | 2 | 2 | A22 |
| A/D CONVERTER | WATER TEMP. A/D VALUE ACQ. REQUEST | 3 | 0 | A30 |
| THROTTLE CONTROLLER | THROTTLE SETTING REQUEST | 4 | 4 | A44 |
| CRANK SENSOR | ENGINE SPEED ACQ. REQUEST | 5 | 0 | A50 |

FIG. 17

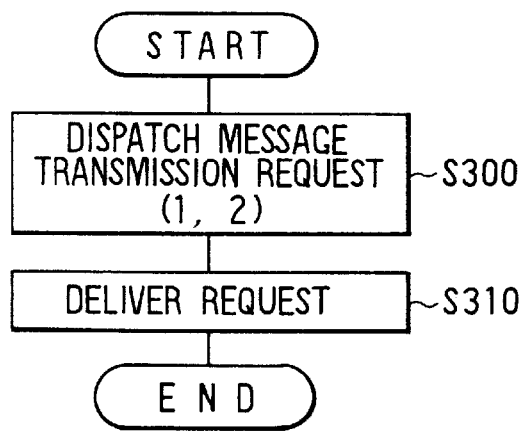

ELECTRONIC CONTROL UNIT HAVING REDUCED INTER-OBJECT MESSAGE MEMORY REQUIREMENTS FOR OBJECT-ORIENTED CONTROL PROGRAM

CROSS-REFERENCE TO RELATED APPLICATIONS

The present invention is a continuation-in-part application of U.S. application Ser. No. 09/104,967, filed on Jun. 26, 1998 now abandoned, which claimed priority from Japanese Patent Application No. Hei. 9-194,627, and is related to, and claims priority from, Japanese Patent Application No. Hei. 11-6574, the contents of which are incorporated herein by reference.

BACKGROUND OF THE PRESENT INVENTION

1. Technical Field

This invention relates to electronic control units, and more particularly to a control unit for controlling multiple control objects in accordance with an object-oriented program in a manner that minimizes the amount of required memory storage space for queuing of inter-object messages.

2. Related Art

Conventionally, an electronic control unit for a vehicle engine includes an engine control program with various types of control schemes. For example, regarding fuel injection control, programs exist for ordinary injection control synchronized with engine speed, injection control not synchronized with engine speed, and fuel cut control for times of high engine speeds.

However, as each of the programs includes programming code that is redundant with that of other programs, additional memory is required to store the programs, and program development time is increased. For example, in the above-mentioned example of fuel injection control, identical control code for driving injectors (fuel injection valves) is redundantly provided in each of the programs. Therefore, when for example control specifications have to be changed for these redundant code sections, it is necessary for the code in each of the programs to be changed, thereby greatly increasing the time required to make such changes.

Object-oriented programming enables the above-mentioned programming code redundancies to be greatly reduced. Such programming includes several objects, with each object being a software module formed by bringing together data and a program (hereinafter called a method) for processing that data. In other words, in object-oriented programming, all the functions of a control program are fractionalized into unit functions, and objects are prepared for those unit functions. Through what is known as inter-object message communication, message exchanges are carried out between objects, thereby enabling the objects to be linked together.

Referring to FIG. 28, a program for controlling engine idling speed based on object-oriented programming will be described. In FIG. 28, objects are represented by vertical lines, and message exchanges between these objects are represented by left-right direction arrows. Also, the rectangular boxes on the object lines represent object processing.

At this point it should be noted that, in this specification, expressions such as "the object does . . . " and "objects do . . . " indicate functions realized by the CPU as it executes methods of objects in carrying out the above-mentioned actions. Further, phrases such as "the object operates" indicates the CPU executing a method of that object.

Regarding the functions of the objects shown in FIG. 28, the ISC object is an object for calculating a target throttle aperture for bringing the engine speed to an optimum idling speed based on the engine water temperature value. The water temperature sensor object is an object for converting a digital value obtained by A/D-converting an analog signal from an engine water temperature sensor into a water temperature value. The A/D-converter object is an object for controlling an A/D-converter for converting the analog signal from the water temperature sensor into a digital value. The throttle controller object is an object for controlling the throttle valve of the engine to the target throttle aperture calculated by the ISC object.

Next, the content of processing realized by the objects of FIG. 28 will be explained. During idling speed control timing, the ISC object starts to operate (that is, the CPU starts to execute a method of the ISC object). Then, as shown by [1] of FIG. 28, the ISC object sends a water temperature acquisition request message to the water temperature sensor object.

Consequently, the water temperature sensor object operates, and as shown by [2] of FIG. 28, sends a water temperature A/D value acquisition request message to the A/D-converter object. Along with the water temperature A/D value acquisition request method, the A/D-converter object converts the analog signal from the water temperature sensor into a digital signal.

The A/D-converter object, when it has finished the above-mentioned computation, as shown by [3] of FIG. 28, sends a water temperature A/D value acquisition response message (that is, a message to the effect that digital conversion of the water temperature sensor has finished) to the water temperature sensor object. When this happens, the water temperature sensor object calculates a water temperature value based on the computation results of the A/D-converter object. After this calculation, as shown by [4] of FIG. 28, the water temperature sensor object sends a water temperature acquisition response message (that is, a message to the effect that the calculation of a water temperature value has finished) to the ISC object.

Subsequently, along with the above-mentioned water temperature acquisition response message, the ISC object calculates a target throttle aperture based on the water temperature value thus calculated. The ISC object then sends a throttle setting request message (that is, a message showing that the target throttle aperture has been calculated) to the throttle controller object as shown by [5] of FIG. 28.

When this happens, the throttle controller object operates, and controls a throttle valve of the engine to the calculated target throttle aperture. The engine speed is thereby controlled to an optimum idling speed.

Therefore, in the above-described object-oriented program, by virtual inter-object message communication wherein objects dispatch messages constituting processing requests to other objects to cause the other objects to operate, the processing order of the objects is determined.

If a program is created based on object-oriented programming, it becomes easy to bring together common parts of the program, and, compared to the above-discussed programs that have redundant programming code, amendment of the object-oriented program becomes simple if program specifications are changed.

When a program is created through object-oriented programming, it is necessary to consider the method of inter-object processing request exchange (inter-object message communication). For such communication, it is conceivable to apply a previously known technique using function calls for inter-object message communication. With function calls, as shown in FIG. 29, a command calling the object method to be processed next is pre-written. When inter-object message communication is to be carried out successively, a command calling another object method is pre-written in the called object method.

Specifically, as shown in FIG. 29, during execution of a method of an object A, a method of an object B is called. Further, during execution of the method of the object B, a method of an object C is called. That is, by function calls, messages constituting processing requests are dispatched to other objects.

As methods for utilizing memory for executing this kind of program, there are active (memory is not secured for storing specific data, but is secured when necessary, and is released when not needed) and static (while the microcomputer is operating, memory is secured for exclusive use in correspondence with content to be stored) methods. In the case of active utilization, memory can be secured universally, irrespective of the content (size/number) of the data, and limited memory resources can be utilized effectively.

For active memory utilization, normally, memory area is managed by the computer operating system (OS). When managed by the OS, system calls such as memory area acquisition and release commands are executed with respect to the OS, and the processing load of the program is large, because memory area provision is secured universally, irrespective of the content (size/number) of the data. Therefore, it is desirable for memory to be managed statically to increase the operating speed, and to be constructed so that it can be actively managed.

However, with the method described above using function calls, execution of the method of the side that made the call is temporarily suspended. After the method of the side that was called is executed, execution of the method that had been suspended is restarted. Thus, to restart the execution of the method that had been suspended, the internal state of the microcomputer before the suspension (that is, the values of the program counters and various registers) must be stored in a stack area of a RAM, thereby requiring additional memory.

In particular, as the number of nestings increases (that is, combinations of calls formed in multiple layers), the amount of RAM consumed increases. In a device such as an electronic control unit whose memory resources are limited, this additional RAM requirement becomes problematic. Furthermore, concerning the amount of RAM required during calling, because the program execution position and values of variables to be used after execution resumption that should be stored change according to sensor inputs and the execution states of other programs, it is difficult to predict the amount of memory that must be pre-secured, thereby making it difficult to use a static memory-type method.

SUMMARY OF THE INVENTION

In view of the above, it is an object of the present invention to provide an electronic control unit that can execute object-oriented programming without consuming a large amount of memory.

More particularly, it is an object of the present invention to provide an electronic control unit capable of executing object-oriented programming to control a control target in real time with minimum memory requirements compared to the memory requirements of conventional control programs.

An electronic control unit according to the invention includes a plurality of unit processors for respectively carrying out processing, in accordance with objects of an object-oriented program, for realizing unit functions that control the objects.

The unit processors are realized by the processor of a microcomputer operating in accordance with an object-oriented program. That is, the processor executes a method of an object to carry out processing for realizing a function allocated to that object. In the electronic control unit of the present invention, as a premise thereof, one of the plurality of unit processors selectively carries out a processing operation, and, by the various unit processors dispatching messages constituting processing requests to other unit processors, the unit processors that are the output destinations of those messages carry out processing.

The electronic control unit of the present invention secures in advance a storage memory area for exclusive use, and stores messages dispatched by the unit processor in this dedicated memory area. Also, the electronic control unit reads a message stored in the message dedicated memory area, and starts processing in whichever of the unit processors is the output destination of the read message.

Therefore, with the electronic control unit of the present invention, memory can be used without the need for reliance on an operating system. Therefore, it is possible to process objects obtained by fractionalizing a program for controlling a control object at a high operating speed into unit functions. Furthermore, because only messages required to start the processing of the unit processors are stored in the memory area secured for exclusive use, the amount of memory that should be secured can be estimated easily, thereby making it possible to reduce the amount of required memory.

BRIEF DESCRIPTION OF THE DRAWINGS

FIG. 4 is an explanatory diagram of a connection information database;

FIG. 5 is an explanatory diagram of a memory message storage area;

FIG. 16 is an explanatory diagram of an object for controlling an idling speed of an engine and a specific example of a connection information database;

FIG. 17 is a flow diagram showing schedule processing executed periodically to determine the timing of idling speed control;

DETAILED DESCRIPTION OF THE PREFERRED EMBODIMENTS

An electronic control unit according to a preferred embodiment of the present invention will now be described with reference to the attached drawings. It should be understood that the present invention is not limited to the following embodiment, as various forms can be utilized as will be appreciated by those skilled in the art.

Figure 1:
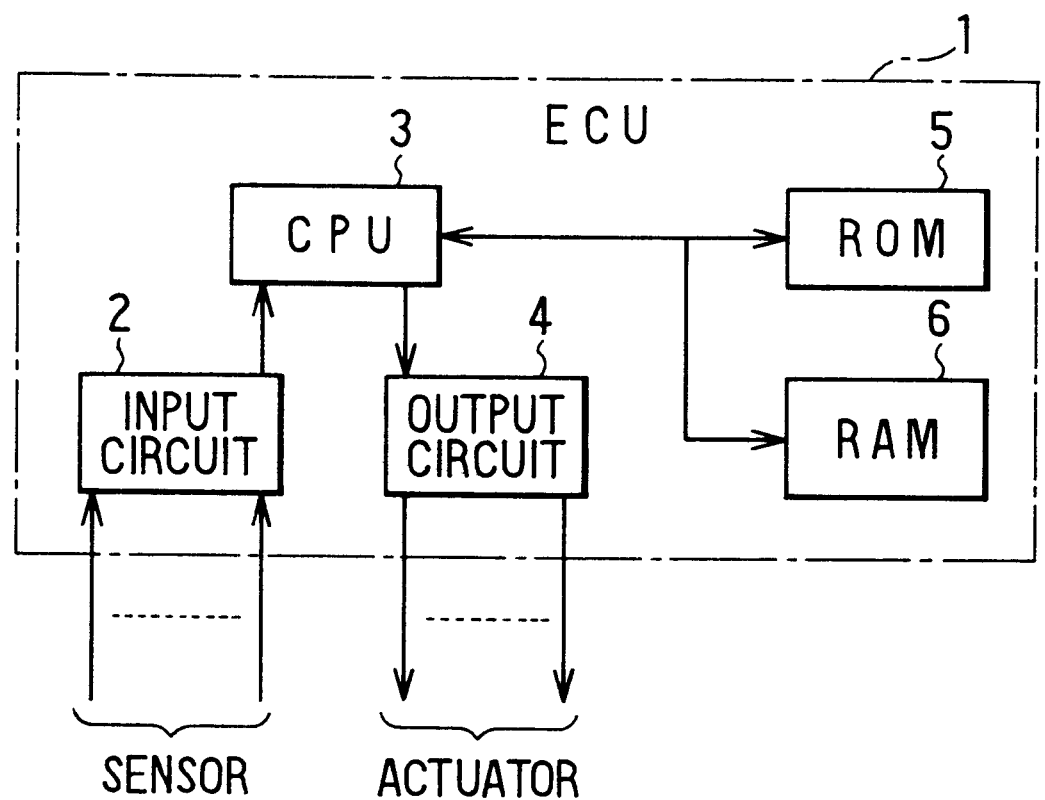
FIG. 1 is a block diagram of an electronic control unit (ECU) of a preferred embodiment of the present invention.

FIG. 1 is a block diagram of the hardware of an electronic control unit 1 (ECU) mounted in a motor vehicle for controlling an internal combustion engine. As shown in FIG. 1, the ECU 1 has a CPU 3 which computes optimum control values for the engine based on input signals from various sensors, such as a water temperature sensor for detecting the water temperature of the engine and a crank sensor for detecting the speed of the engine. The CPU 3 outputs control signals based on the computed results. The ECU 1 also includes an input circuit 2 which inputs signals from the various sensors to the CPU 3, and an output circuit which receives and outputs control signals from the CPU 3 for driving actuators such as a throttle valve and engine fuel injection valves. A nonvolatile ROM 5 stores programs that the CPU 3 executes to control the engine as well as data utilized in the execution of those programs, and a volatile RAM 6 temporarily stores computation results of the CPU 3.

In the ECU 1, the main parts of a microcomputer include the CPU 3, the ROM 5 and the RAM 6. Part of the storage area of the RAM 6 is set as backup RAM capable of holding stored content even when the power supply to the ECU 1 has been cut off. A debug tool 7 is connected to the input and output circuits 2, 4 from outside the ECU 1 to determine whether a program executed by the CPU 3 is operating properly. When the debug tool 7 is connected to the input-output circuit 2, the CPU 3 performs predetermined processing for program operation checking when there is a flag DEBUG inside the RAM 6.

In the ECU 1 of the present invention, the programs and data for engine control stored in the ROM 5 and executed by the CPU 3 are programmed based on object-oriented programming. For this, in the ECU 1, the message delivery control part 10 shown in FIG. 2 is provided to realize inter-object message communication previously mentioned.

Figure 2:
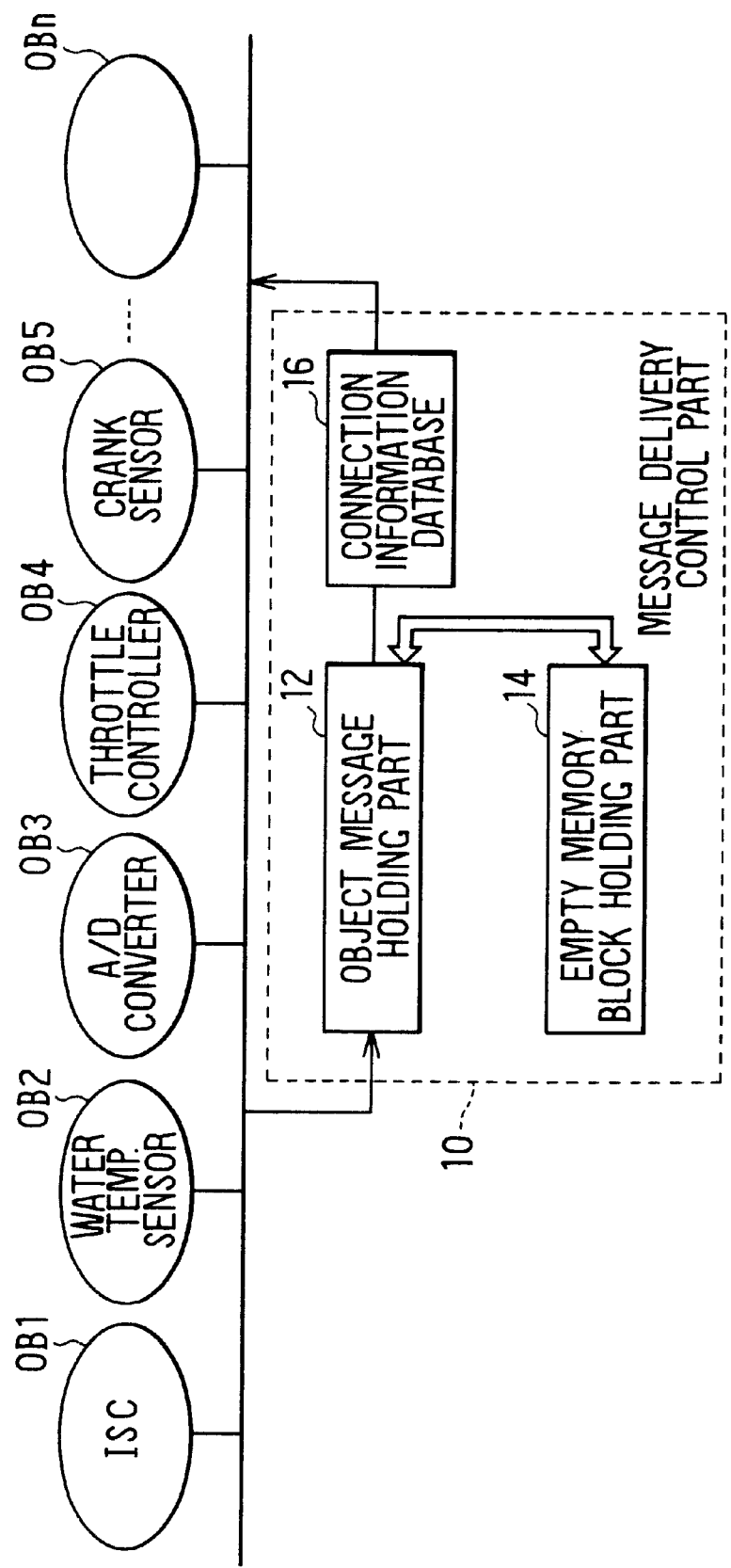
FIG. 2 is a concept diagram showing the relationship between objects for engine control and a message delivery control part.

FIG. 2 shows the relationship between engine control objects stored in the ROM 5 and the message delivery control part 10. The message delivery control part 10 is not hardware-implemented, but rather is realized by the CPU 3 operating in accordance with an object for message delivery control stored in the ROM 5. As a result, the message delivery control part 10 will be described using the example of a program part for controlling the engine idling speed.

As shown in FIG. 2, several objects are stored in the ROM 5 for controlling engine idling speed: An ISC object OB1 for calculating a target throttle aperture for bringing the engine speed to an optimum idling speed based on the water temperature value and the actual engine speed; a water temperature sensor object OB2 for converting a digital value obtained by A/D-converting an analog signal from the water temperature sensor into a water temperature value; an A/D-converter object OB3 for controlling an A/D-converter (not shown) for converting the analog signal from the water temperature sensor into a digital value; a crank sensor object OB5 for calculating the engine speed based on a signal from the crank sensor; and a throttle controller object OB4 for controlling the throttle valve of the engine to the target throttle aperture calculated by the ISC object. Also, objects other than the above-mentioned objects OB1–OB5 are stored in the ROM 5, including an object for realizing the function of the message delivery control part 10.

Next, referring to FIG. 3, an outline of processing realized by the objects OB1–OB5 will be described.

Figure 3:
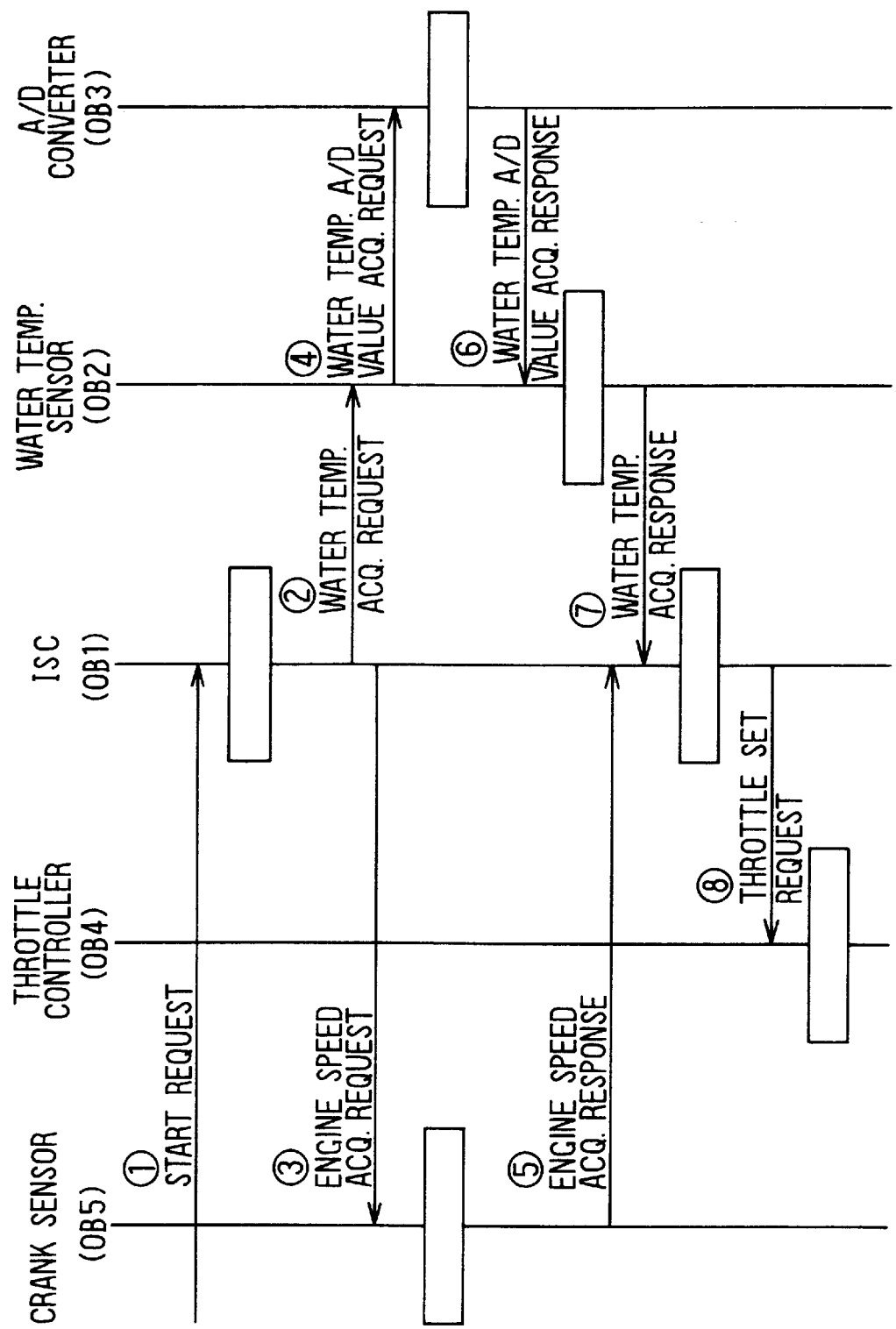
FIG. 3 is a message sequence diagram for processing of objects for controlling an idling speed.

When a start request message is periodically dispatched to the ISC object OB1 from an object other than the objects OB1–OB5 (for example every 4 ms) to determine the timing of the idling speed control as shown at [1] of FIG. 3, the ISC object OB1 starts to operate (that is, the CPU 3 starts execution of the method of the ISC object OB1). Subsequently, as shown at [2], the ISC object OB1 outputs a water temperature acquisition request message to the water temperature sensor object OB2, and then, as shown at [3], dispatches an engine speed acquisition request message to the crank sensor object OB5. When this happens, in accordance with the above-mentioned water temperature acquisition request message, the water temperature sensor object OB2 operates and, as shown at [4], dispatches a water temperature A/D value acquisition request message to the A/D-converter object OB3.

Meanwhile, in accordance with the above-mentioned engine speed acquisition request message, the crank sensor object OB5 calculates an engine speed based on the signal from the crank sensor. The crank sensor object OB5 then dispatches an engine speed acquisition response message (that is, a message to the effect that the calculation of the engine speed is finished) to the ISC object OB1 after finishing the calculation of the engine speed, as shown at [5] of FIG. 3.

Also, in accordance with the water temperature A/D value acquisition request message dispatched by the water temperature sensor object OB2, the A/D-converter object OB3 operates and converts the analog signal from the water temperature sensor into a digital value. As shown at [6] of FIG. 3, the A/D-converter object OB3, after finishing this computation, dispatches a water temperature A/D value acquisition response message (that is, a message that the digital conversion of the water temperature sensor is finished) to the water temperature sensor object OB2.

When this happens, the water temperature sensor object OB2 calculates a water temperature value based on the computation result of the A/D-converter object OB3, and after that calculation, as shown at [7] of FIG. 3, dispatches a water temperature acquisition response message (that is, a message that the calculation of the water temperature value is finished) to the ISC object.

Subsequently, in accordance with the water temperature acquisition response message or the engine speed acquisition response message, the ISC object OB1 calculates a target throttle aperture based on the water temperature value calculated by the water temperature sensor object OB2 and the engine speed calculated by the crank sensor object OB5. After the target throttle aperture is calculated, the ISC object OB1, as shown at [8] of FIG. 3, dispatches a throttle setting request message (that is, a message indicating that the target throttle aperture has been calculated) to the throttle controller object OB4.

When this happens, the throttle controller object OB4 operates and controls the throttle valve of the engine so that the calculated target throttle aperture is obtained, and thus the engine speed is controlled to an optimum idling speed.

In this way, in the ECU 1 of the present invention, the processing sequence of the objects OB1 through OB5 is determined by virtual inter-object message communication wherein the objects OB1–OB5 dispatch messages as processing requests to other objects and the objects that are the destinations to which those messages are output operate.

The message delivery control part 10 for realizing this kind of inter-object message communication queues the messages that the objects dispatch. Whenever a predetermined delivery condition is established, the control part reads out the message which queued first among the queued messages, and delivers that message to the object that is the respective output destination.

It should be appreciated that the term "queuing" refers to an action of inserting and storing data with respect to a queue, with a "queue" being a waiting line wherein insertion of data is carried out at one end of the data structure and deletion of data is carried out at the other end. Further, it should be appreciated that the term "delivery" refers to the start of processing of the object that is the output destination of the message (specifically, execution of the method of the object specified by the message).

As shown in FIG. 2, the message delivery control part 10 has an object message holding part 12 for queuing messages from objects, and an empty memory block holding part 14 for providing this object message storing part 12 with storage area for storing (queuing) messages.

Here, the object message holding part 12 and the empty memory block holding part 14 provide storage area exclusively for messages in the RAM 6, and, as will be discussed later, the capacity of the storage area provided fluctuates dynamically.

In this embodiment, in the object-dispatched messages, an object identification number (hereinafter, OID) indicating the output destination object of the message, and a method identification number (hereinafter, MID) indicating the method to be executed among the methods of the destination object, are included as message content. In addition, an argument is also sometimes included; however, instead of an argument, an address at which data necessary for computation of the message transmission destination is stored may be included.

The message delivery control part 10, as shown in FIG. 2, has a connection information database 16 for specifying the delivery destination of a message read from the object message holding part 12. In other words, the database is for specifying the ROM holding address indicated by the OID and the MID of the method of the object.

The connection information database 16, as shown in FIG. 4, consists of a data table having associated and stored combinations of OIDs and MIDs, and leading addresses of the ROM 5 at which the object methods designated by these combinations are held (that is, execution start addresses). For example, in the data table of FIG. 4, the object method whose OID is n and whose MID is m is held with the address "Anm" as its top in the ROM 5. The connection information database 16 made up of this kind of data table is pre-stored in the ROM 5 together with the objects.

Next, the details of the object message holding part 12 and the empty memory block holding part 14 mentioned above will be described. The above-mentioned message storage area is secured with a predetermined capacity matched to the amount of data in a message as units (a storage area of that unit capacity is called a memory block). That is, a predetermined number (for example 5) of memory blocks specified by the program are secured in the RAM 6 as storage area exclusively for messages.

As shown in FIG. 5A, these memory blocks have an OID part for storing the OID of the message output destination, an MID part for storing the MID of the message output destination, and an argument part for storing an argument. Also, because a sequence from securing to releasing is decided in accordance with predetermined rules when memory blocks are secured in the object message holding part 12 and the empty memory block holding part 14, the memory block also has a pointer for specifying the memory address of the next memory block in the sequence in accordance with this order.

For example, if five memory blocks are secured in the order of the memory addresses 0000–0004, as shown in FIG. 5B, 0001 is written in the pointer of the memory block of the memory address 0000, 0002 in the pointer of the memory block of the memory address 0001 and so on, and NULL, meaning that nothing exists, is written in the pointer of the memory block of the final memory address 0004.

To simplify the following explanation, the number of memory blocks secured will be standardized to five, and the order in which the blocks are released will be standardized to 0000, 0001, 0002, 0003 and 0004. However, the above number of memory blocks and release order is by way of example only. of these pre-secured memory blocks, memory blocks (hereinafter called message blocks) in which messages (including, inter alia, an OID and an MID) have been written are secured in the object message holding part 12, and memory blocks in which messages have not been written (hereinafter called empty memory blocks) are secured in the empty memory block holding part 14.

When a message is dispatched from an object, the number of memory blocks secured by the empty memory block holding part 14 decreases by one. Consequently, the number of memory blocks that the object message holding part 12 secures increases by one, and a message is stored in the added memory block. When a message is read from the object message holding part 12 and is delivered to an object, the memory block in which that message had been stored is returned from the object message holding part 12 to the empty memory block holding part 14.

Referring to FIG. 6, the manner in which the object message holding part 12 and the empty memory block holding part 14 secure memory blocks will now be described.

Of the memory blocks that the object message holding part 12 and the empty memory block holding part 14 respectively secure, the memory address of the memory block to be released first is stored as a head address, and the memory address of the memory block to be released last is stored as a tail address.

Figure 6A:
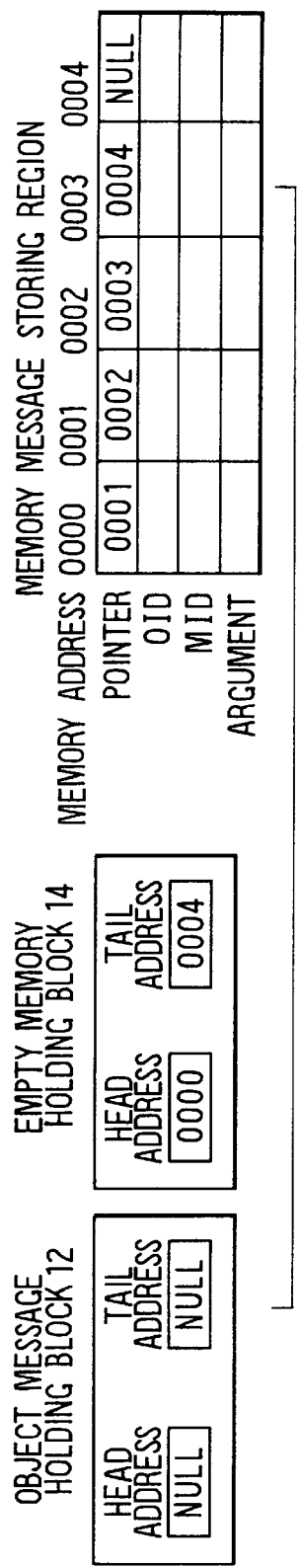
FIG. 6 is an explanatory diagram of a method of securing memory blocks with an object message holding part and an empty memory block holding part.

Referring to FIG. 6A, because the memory blocks are initially all empty memory blocks and messages are not being queued, the empty memory block holding part 14 stores 0000 as the head address and 0004 as the tail address, and the object message holding part 12 stores NULL as the head address and as the tail address. In accordance with the decided order, 0001, 0002, 0003, 0004, NULL are respectively written into the pointers of the memory blocks (empty memory blocks) of the memory addresses 0000–0004.

Figure 6B:
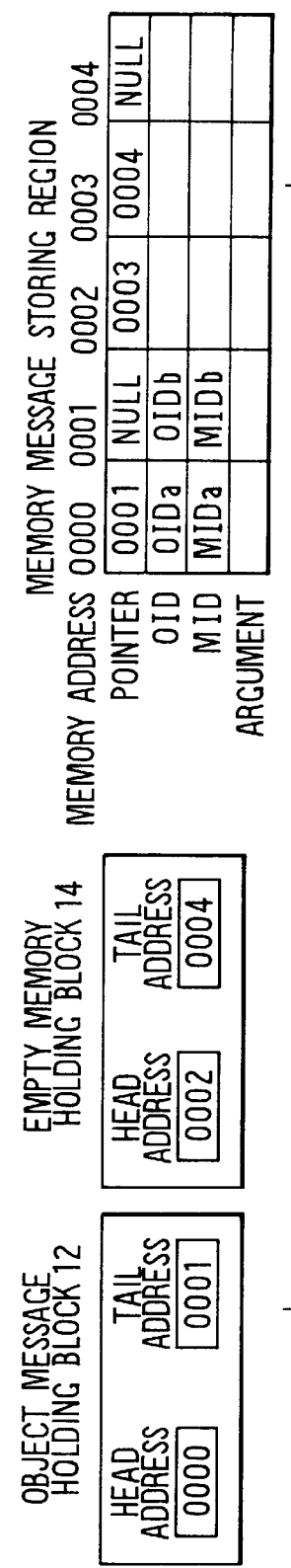

Message exchange is then carried out. If two messages have been queued, as shown in FIG. 6B, the object message holding part 12 stores 0000 as its head address and 0001 as its tail address, and the empty memory block holding part 14 stores 0002 as its head address and 0004 as its tail address.

In the pointers of the memory blocks (message blocks) of the memory addresses 0000 and 0001, respectively 0001, NULL are written, and in the pointers of the memory blocks (empty memory blocks) of the memory addresses 0002, 0003, 0004, respectively 0003, 0004, NULL are written. OIDa, OIDb, MIDa, MIDb are the OIDs and MIDs of the output destinations of the queued messages.

Figure 6C:
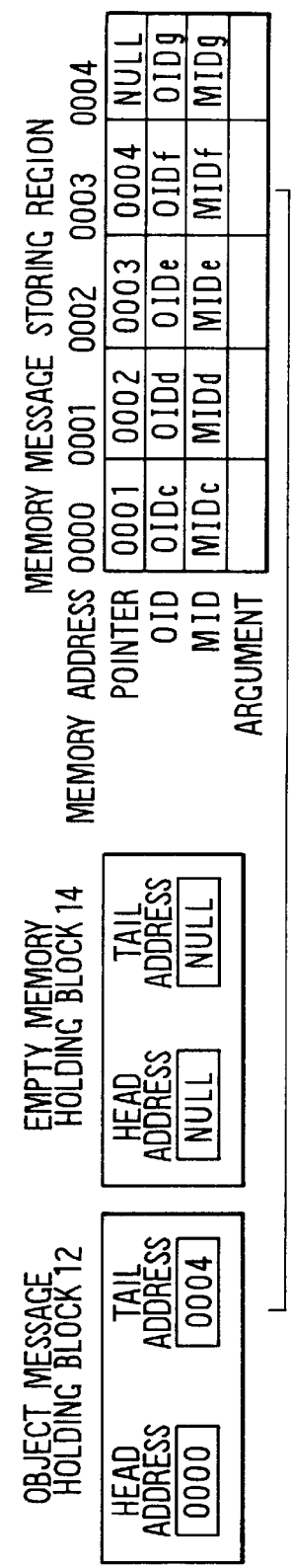

As shown in FIG. 6C, when message exchange has been carried out from the state of FIG. 6A and five messages have been queued, because there are no empty memory blocks, the object message holding part 12 stores 0000 as its head address and 0004 as its tail address, and the empty memory block holding part 14 stores NULL as its head address and as its tail address.

In the pointers of the memory blocks (message blocks) of the memory addresses 0000 through 0004, as shown in the figure, 0001, 0002, 0003, 0004, NULL are written. OID c–g and MID c–g are the OIDs and MIDs of the output destinations of the queued messages.

When a message is to be queued from an object, first, the empty memory block holding part 14 releases a memory block by writing in its head address the memory address of the memory block to be released following the memory block of the memory address stored as its head address. After that, it writes the OID, MID and argument of the received message in the respective locations in the released memory block. Then, the pointer of the memory block of the memory address that had until now been stored as the tail address of the object message holding part 12 is rewritten from NULL to the memory address of the memory block to be newly secured, and the pointer of the newly secured memory block is made NULL. Finally, the memory address of the newly secured memory block is stored as the tail address of the object message holding part 12.

When a message is to be delivered to an object, the memory address of the memory block to be released following the memory block of the memory address that had been stored as the head address in the object message holding part 12 is re-stored as the head address, and the memory block is thereby released. The OID and the MID stored in the released memory block are then read in, and the message is delivered to the respective object.

Next, so that the memory block released from the object message holding part 12 is secured by the empty memory block holding part 14, the pointer of the memory block of the memory address that had until now been stored as the tail address in the empty memory block holding part 14 is rewritten from NULL to the memory address of the released memory block, and NULL is written to the pointer of the memory block to be newly secured. Finally, the memory address of the memory block to be newly secured is stored as the tail address in the empty memory block holding part 14.

Thus, conceptually, all of the memory blocks secured in the RAM 6 are at first in the empty memory block holding part 14, and, when a message is dispatched from an object, one memory block is handed over (transferred) from the empty memory block holding part 14 to the object message holding part 12, and the message is stored in the transferred memory block. When a message queued in the object message holding part 12 is read out and delivered to an object, the memory block in which that message had been stored is returned from the object message holding part 12 to the empty memory block holding part 14 and is re-used.

Next, state transitions and functions of the message delivery control part 10 will be explained with reference to FIG. 7. The processing of the message delivery control part 10 explained in the following is, in practice, realized by the CPU 3 operating in accordance with message delivery control objects (methods and data) held in the ROM 5.

The message delivery control part 10 assumes an off state shown at 20 when the ignition switch of the vehicle has been turned off and the microcomputer of the ECU 1 has stopped operating. Then, when, for example, the ignition switch is turned on and an initialization request such as a reset applied to the microcomputer is generated, initialization processing is carried out as shown at 22. Thereafter, as shown at 24, the control part 10 assumes a message reception waiting state.

Figure 7:
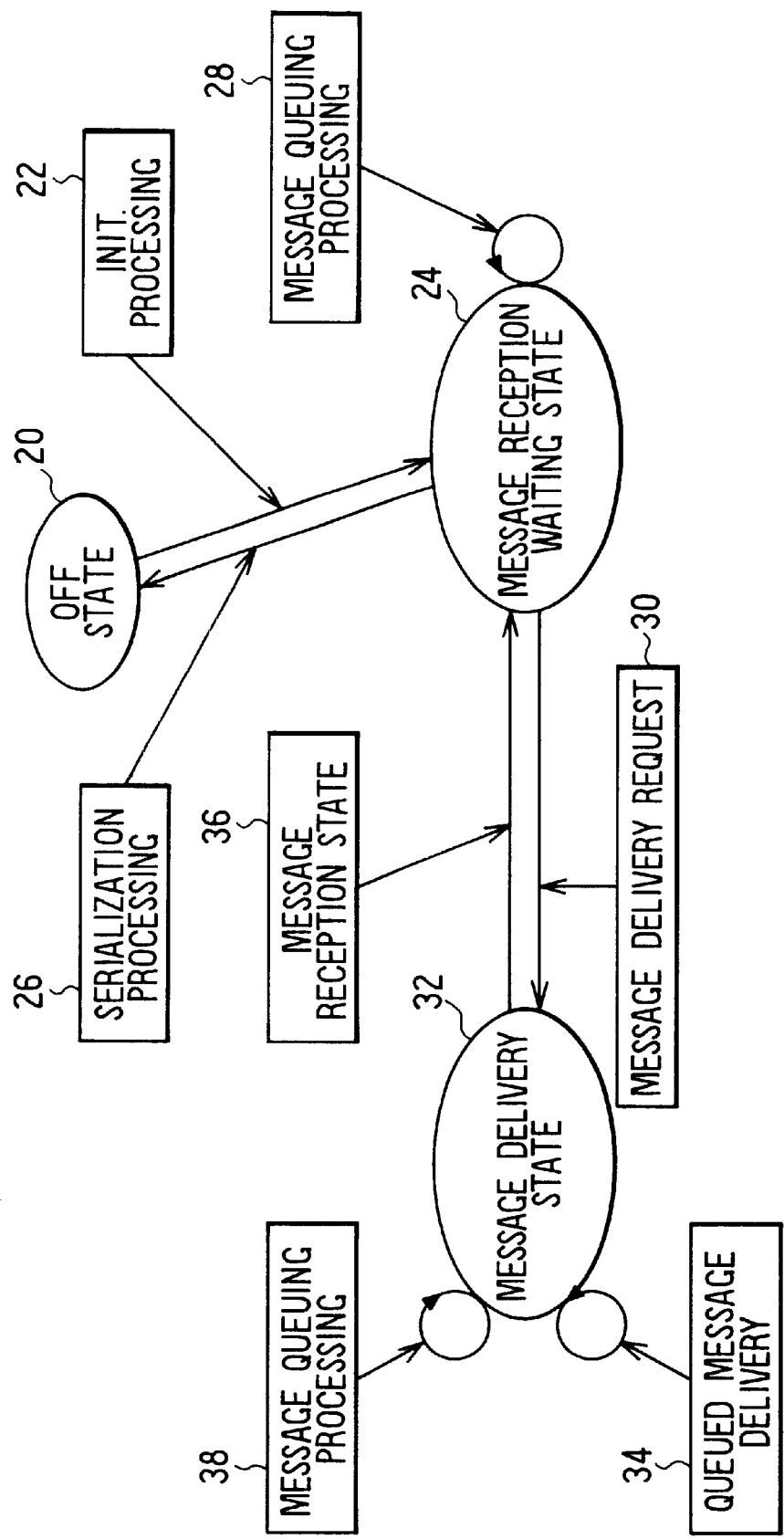
FIG. 7 is a state transition diagram showing state transitions of a message delivery control part.
Figure 8:
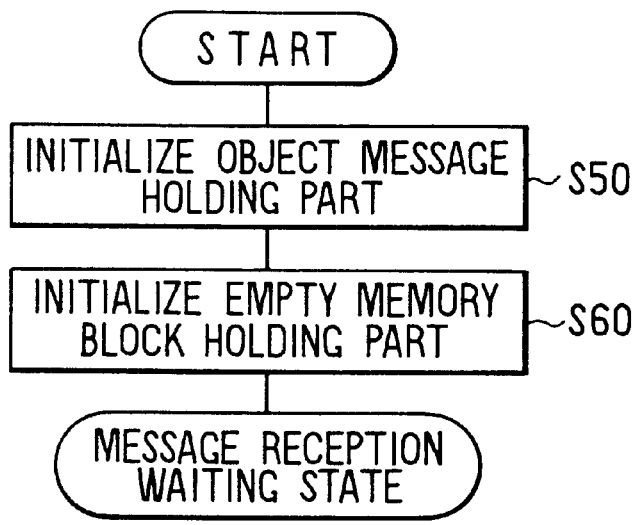
FIG. 8 is a flow diagram showing initialization processing of a message delivery control part.

Here, in the initialization processing carried out at 24 in FIG. 7, as shown in FIG. 8, the object message holding part 12 is initialized at S50. Specifically, as shown in FIG. 6A, the head address and the tail address stored in the object message holding part 12 are made NULL.

Next, at S60, the empty memory block holding part 14 is initialized. Specifically, first a number (in the present example, five) of empty memory blocks stipulated by the program is secured. Then, in accordance with the decided order of release (in this example, 0000, 0001, 0002, 0003, 0004), in the pointer of each memory block, the memory address of the memory block to be subsequently released is written (NULL in the pointer of the memory block of the memory address 0004). Then, the addresses predetermined as the head address and the tail address (in this example, the head address is 0000 and the tail address is 0004) are written to the empty memory block holding part 14. As a result, a state is assumed wherein, when a message has been dispatched from one of the objects, an empty memory block in the empty memory block holding part 14 can be transferred to the object message holding part 12.

Next, the message delivery control part 10, after the above initialization processing is finished, assumes a message reception waiting state. The message reception waiting state is a state wherein a message dispatched from an object can be queued in the object message holding part 12. In this state, when an end request such as the ignition switch being turned off is generated, the message delivery control part 10 carries out serialization processing as shown in FIG. 7D, and thereafter returns to the off state mentioned above.

Figure 9:
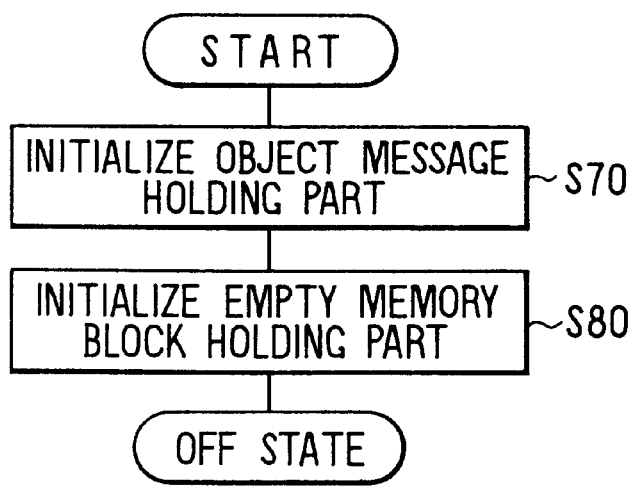
FIG. 9 is a flow diagram showing serialization processing of a message delivery control part.

Here, in the serialization processing carried out at 26, as shown in FIG. 9, the object message holding part 12 is initialized at S70. Then at S80, the empty memory block holding part 14 is initialized as at S50 and S60 of the initialization processing of FIG. 8.

As shown in FIG. 7 at 28, on the other hand, in the message reception waiting state, when a message is dispatched from an object, the message delivery control part 10 carries out message queuing processing, and queues the above-mentioned message from an object in the object message holding part 12 before returning to the message reception waiting state.

In this embodiment, messages are output based on an object dispatching a message transmission request. In the following description, a message whose OID is n (=1, 2, . . . ) and whose MID is m (=1, 2, . . . ) as message content will be written as "message (n, m)", and a message transmission request for outputting that message (n, m) will be written "message transmission request (n, m)".

Figure 10:
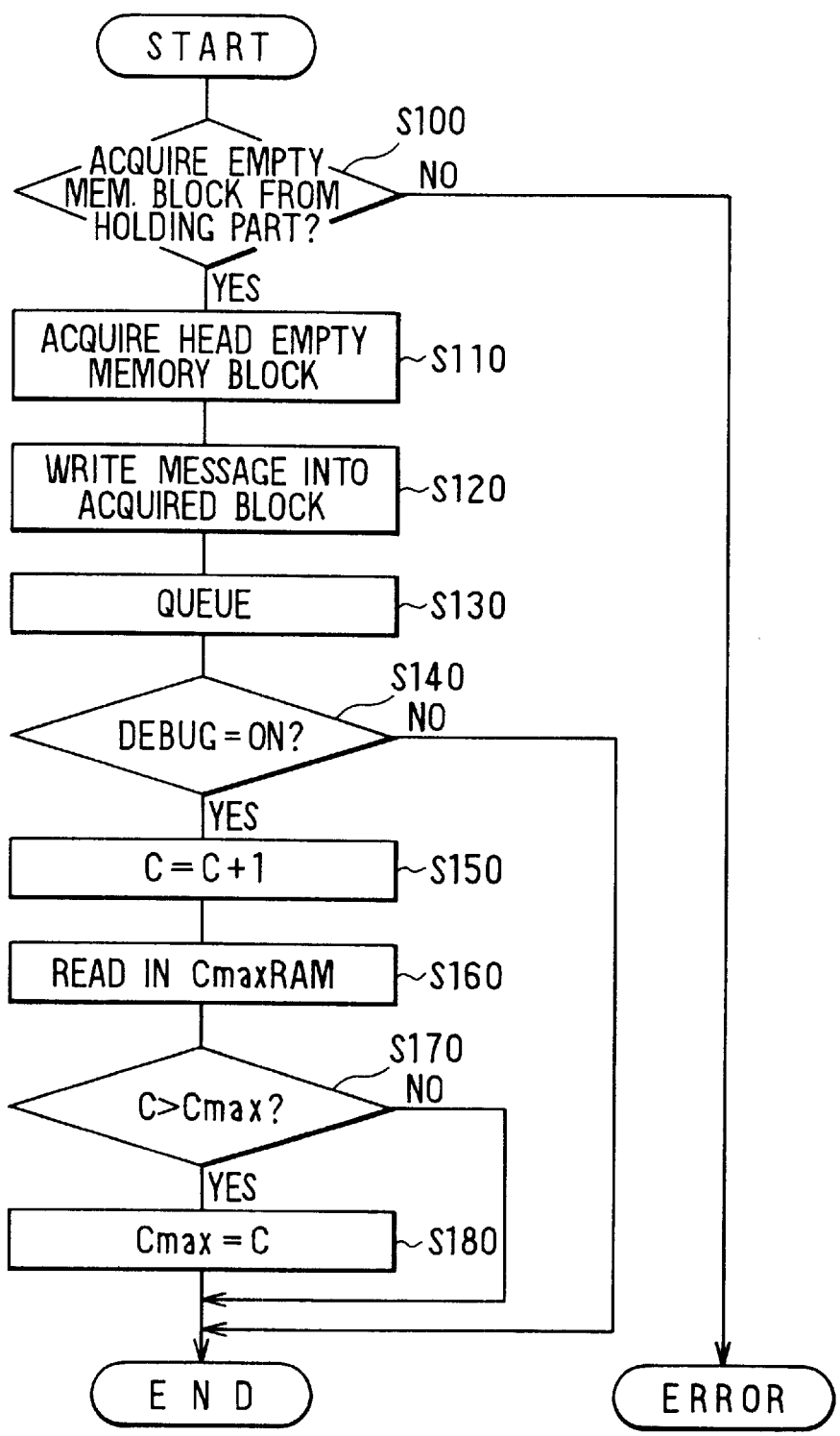
FIG. 10 is a flow diagram showing message queuing processing of a message delivery control part.

As shown in FIG. 10, in message queuing processing carried out when an object has dispatched a message (message transmission request), at S100, it is determined whether or not an empty memory block can be acquired from the empty memory block holding part 14 (in other words, whether or not an empty memory block has been secured in the empty memory block holding part 14). Then, if an empty memory block is acquirable, at S110, the empty memory block stored as the head address in the empty memory block holding part 14 is acquired from the empty memory block holding part 14.

At S120, the message dispatched from the object this time is written in the acquired empty memory block. Specifically, the OID and MID, and possibly also an argument, comprising the content of the message are written in the empty memory block. Then, at S130, the memory block in which the message was written at S120 is queued in the object message holding part 12. That is, the memory address of the memory block in which the message was written is written to the pointer of the message block that had until now been secured at the end tail, and NULL is written to the pointer of the memory block in which the message was written. The memory address of the memory block in which the message was written is also stored as the tail address in the object message holding part 12.

At S140 it is determined whether or not a flag DEBUG showing a debug state is OFF. When at S140 it is determined that the flag DEBUG is ON, a counter C is incremented by one at S150 to count the maximum value of the queuing messages during debugging. This counter C is a counter incremented by one during queuing processing of a message and decremented by one in message delivery processing, which will be further discussed later.

At S160, the value of a maximum value Cmax of the number of queuing messages up to now is read from the RAM, and at S170 the sizes of the counter C and the maximum value Cmax are compared. When the value of the counter C is greater, because the present queuing number is the maximum present value in debug processing, at S180 the maximum value Cmax is replaced with the value of the counter C, and message queuing processing is ended. When at S180 it is determined that the counter value is smaller than the value of the maximum value Cmax, it is inferred that even if this queuing processing is ended, the maximum value Cmax which had been stored in the RAM will remain the maximum value, and message queuing processing is ended.

When at S140 it is determined that the flag DEBUG is OFF, because debugging is not in progress, message queuing processing is ended without the above-mentioned debug processing being carried out.

Further, when at S100 it is determined that an empty memory block cannot be acquired (in other words, there are no empty memory blocks in the empty memory block holding part 14), an error message is dispatched to the method of the object which dispatched the message transmission request. As a result, it can be determined that the number of empty memory blocks secured is low.

Figure 11A:
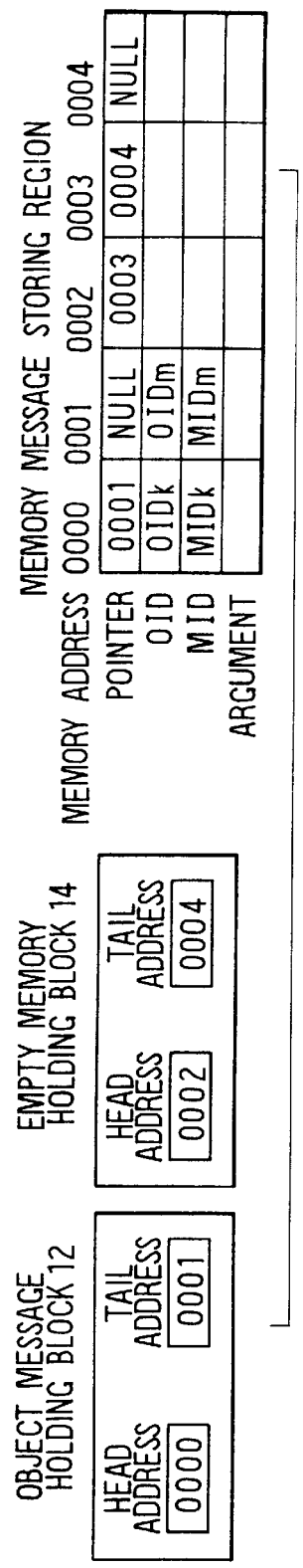
FIG. 11 is an explanatory diagram for message queuing processing.

Next, referring to FIGS. 11 and 12, the manner of queuing messages and releasing and securing memory blocks via message queuing processing will be explained. FIG. 11 is an example wherein, as shown in FIG. 11A, the memory blocks of memory addresses 0000, 0001 are message blocks and the memory blocks of memory addresses 0002, 0003, 0004 are empty memory blocks. Also, FIG. 12 is an example wherein, as shown in FIG. 12A, the memory blocks of memory addresses 0003, 0004 are message blocks and the memory blocks of memory addresses 0000, 0001, 0002 are empty memory blocks. Here, OID k, m, n, p, q, r and MID k, m, n, p, q, r are the OIDs and MIDs of the messages.

Figure 11B:
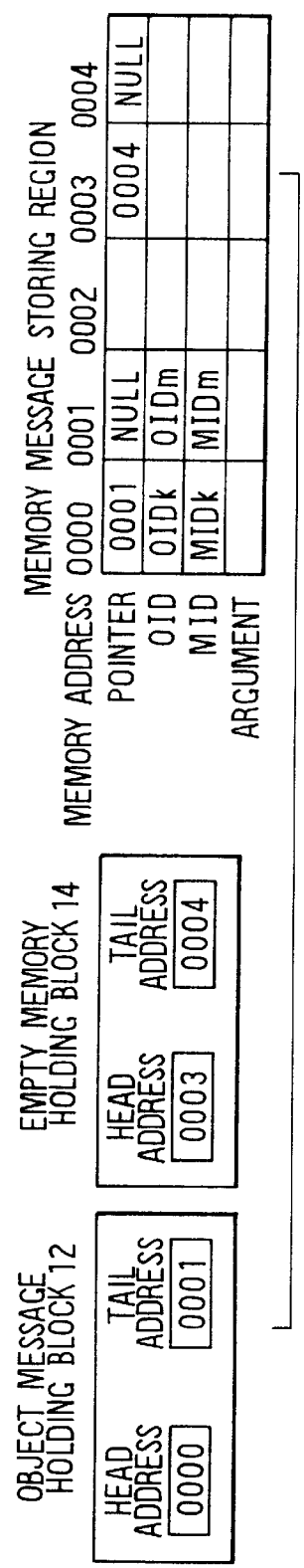
Figure 11C:
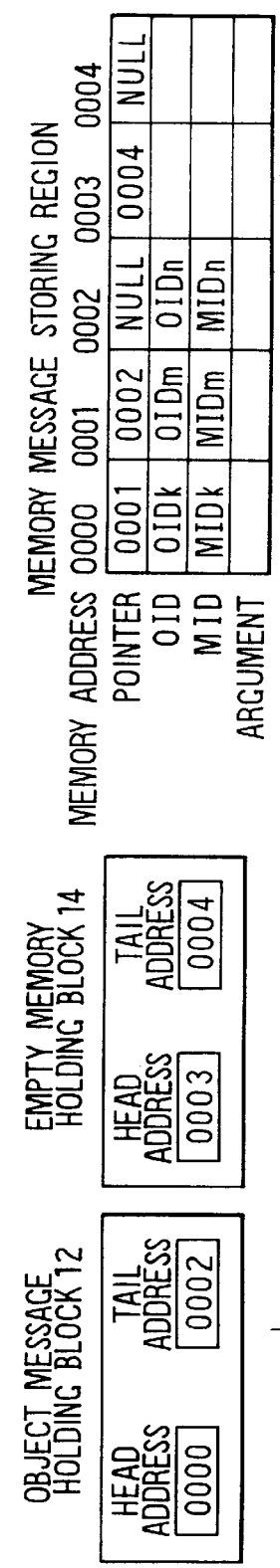
Figure 12A:
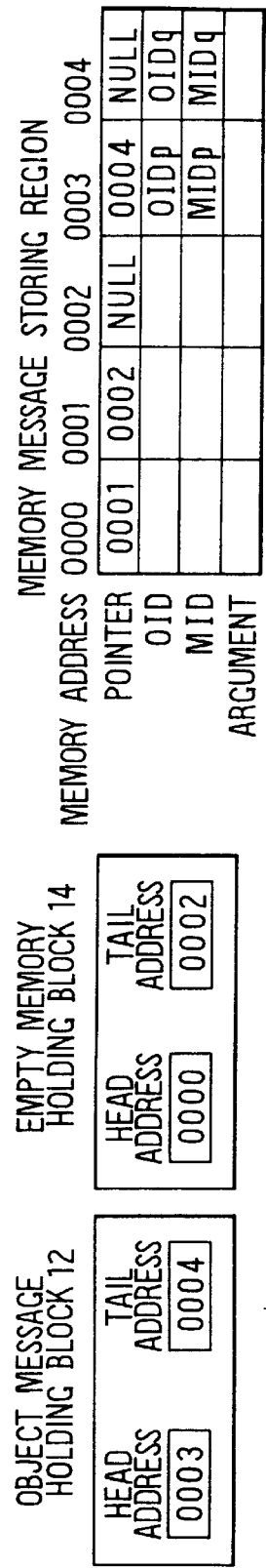
FIG. 12 is an explanatory diagram for another example of message queuing processing.
Figure 12B:
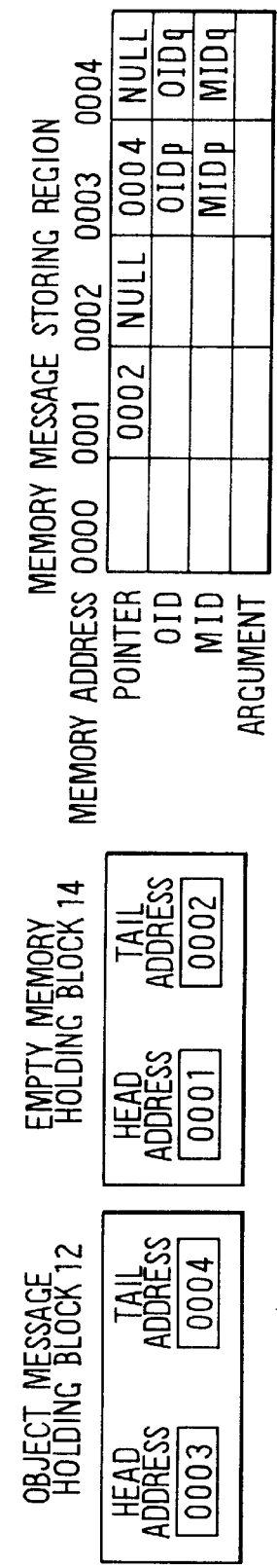

Initially, the memory block of the memory address stored as the head address in the empty memory block holding part 14 is selected (the memory block whose memory address is 0002 in the example of FIG. 11, 0000 in the example of FIG. 12). Then, as shown in FIG. 11B and FIG. 12B, the head address of the empty memory block holding part 14 is re-stored with the memory address of the next memory block (0003 in the example of FIG. 11, 0001 in the example of FIG. 12), and the pointer of the acquired memory block is deleted (S100: YES, S110).

Figure 12C:
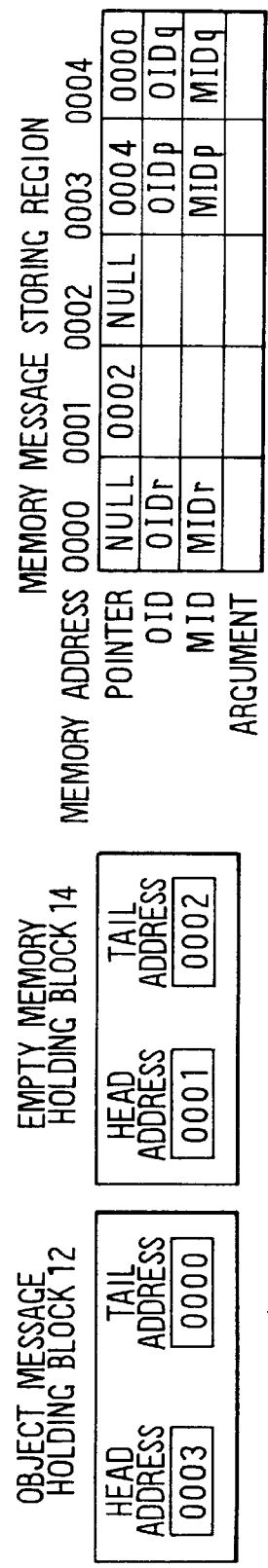

Then, as shown in FIG. 11C and FIG. 12C, the content of the message dispatched from an object (OIDn, MIDn in the example of FIG. 11 and OIDr, MIDr in the example of FIG. 12) is written in this acquired empty memory block (S120), the memory address of the newly secured memory block (0002 in the example of FIG. 11 and 0000 in the example of FIG. 12) is written to the pointer of the memory block that had until now been the tail address (the memory block whose memory address was 0001 in the example of FIG. 11, 0004 in the example of FIG. 12), and NULL is written to the pointer of the newly acquired memory block. Additionally, so that the memory block in which the message content was written (the memory block whose memory address is 0002 in the example of FIG. 11, 0000 in the example of FIG. 12) becomes the end tail of the memory blocks in the object message holding part 12, its memory address is stored as the tail address in the object message holding part 12.

If the flag DEBUG is ON, the value of the counter C is incremented by one, and becomes the same value as the number of queuing messages (C=3 in both the example of FIG. 11 and the example of FIG. 12) (S140: YES, S150). If the maximum value Cmax of the present queuing number is greater than the value of the counter C, the value of C is written to Cmax (S170: YES, S180). The queuing processing of messages then ends.

Thus, as shown in FIGS. 11 and 12, the number of message blocks secured in the object message holding part 12 increases by one, while the number of empty memory blocks secured in the empty memory block holding part 14 decreases by one. Also, the empty memory block whose order of release initially was second in the empty memory block holding part 14 (the memory block whose memory address is 0003 in the example of FIG. 11, 0001 in the example of FIG. 12) becomes the head empty memory block, and the empty memory block which initially was third (the memory block whose memory address is 0004 in the example of FIG. 11, 0002 in the example of FIG. 12) becomes the second empty memory block.

When in the message reception waiting state a message delivery request is dispatched from the object as shown at 30 in FIG. 7, the message delivery control part 10 assumes a message delivery state as shown at 32.

In the message delivery state, as shown at 34, if there is a message queued in the object message holding part 12, message delivery processing, which will be further discussed later, is carried out, and delivery of that queued message (that is, execution of the method of the object specified by the message) is performed. As shown in FIG. 36, if there is no message queued in the object message holding part 12, the message holding part returns to the message reception state.

As shown at 38 in FIG. 7, in the message delivery state, when a message transmission request is dispatched from an object being executed, the message queuing processing of FIG. 10 described above is carried out in the same way as in the case of the message reception waiting state.

Figure 13:
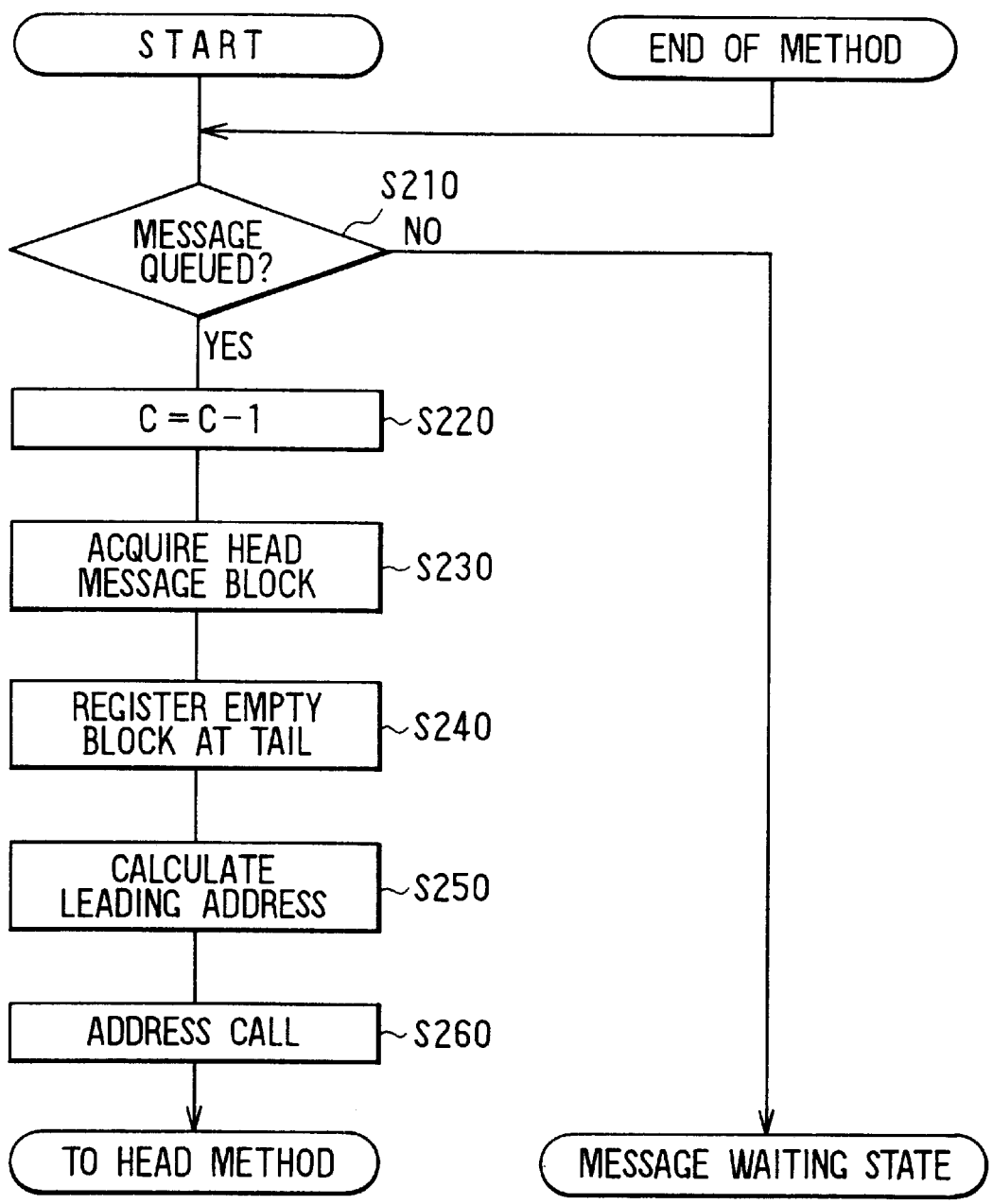
FIG. 13 is a flow diagram showing message delivery processing of a message delivery control part.

As shown in FIG. 13, message delivery processing is carried out when a message delivery request has been dispatched from an object, or when the execution of a method of an object has finished. At S210, it is determined whether or not there is a message queued in the object message holding part 12 (that is, whether or not it is possible to acquire a message block from the object message holding part 12). If there is a queued message, at S220, because one message is to be delivered, the above-mentioned counter C counting the number of messages queuing is decremented by one. At S230, from the object message holding part 12, the head message block is acquired, and the contents of the message written in that message block (OID and MID) are read.

At S240, the message block acquired at S230 is an empty memory block and is registered at the end of the queue in the empty memory block holding part 14. At S250, the leading address (execution start address) of the ROM 5 at which the method of the object corresponding to the OID and MID is calculated by searching from the above-mentioned connection information database 16. At S260 the execution start address calculated in S250 is then called.

As a result, the program execution point of the CPU 3 shifts to the head of the method of the object corresponding to the message contents read at S230, and delivery of the message is carried out. When the processing execution of the method has finished, the message delivery processing is again carried out from the above-mentioned S210. When on the other hand it is determined at S210 that there is no message queuing in the object message holding part 12, it returns directly to the message reception waiting state.

Figure 14A:
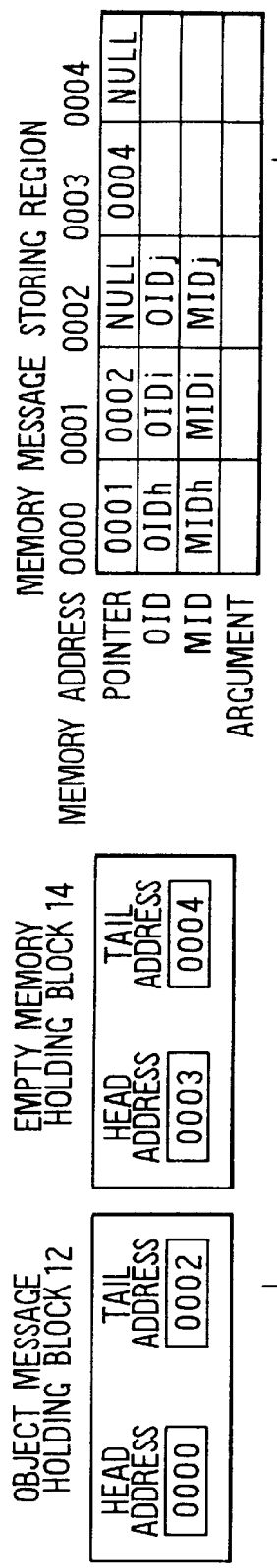
FIG. 14 is an explanatory diagram for an example of message delivery processing.
Figure 14B:
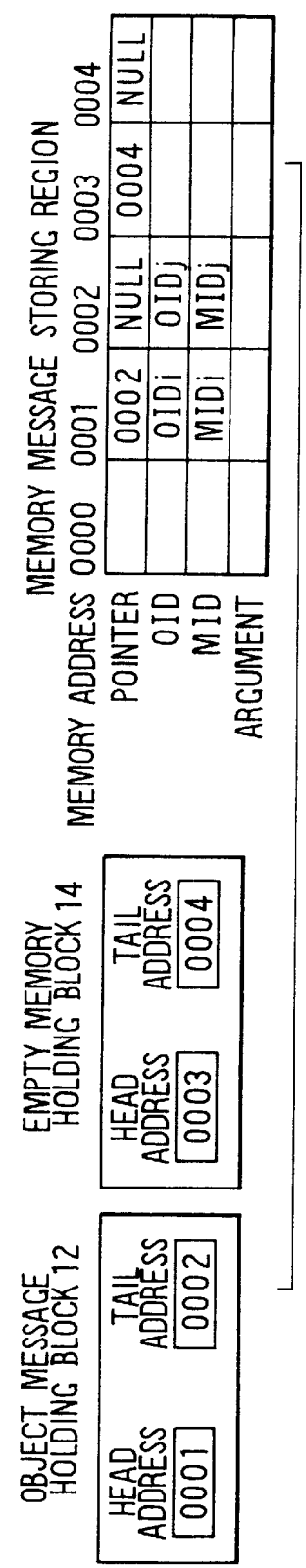
Figure 14C:
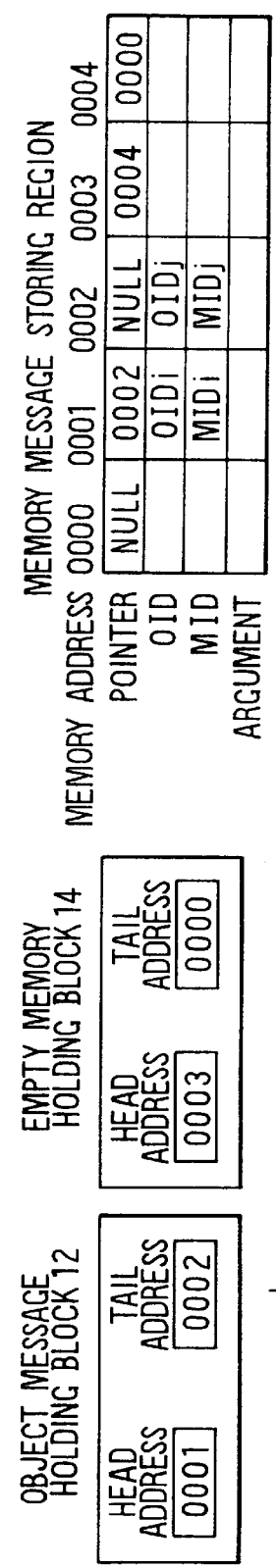
Figure 15A:
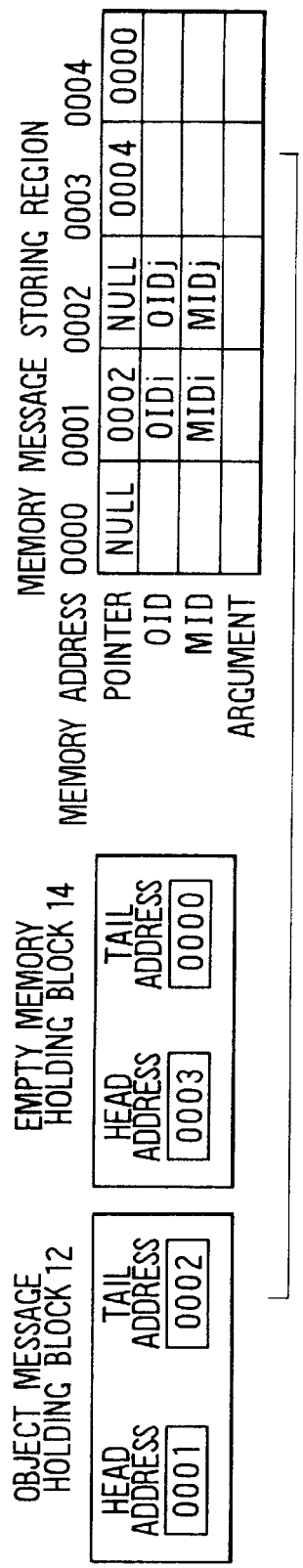
FIG. 15 is an explanatory diagram of another example of message delivery processing.
Figure 15B:
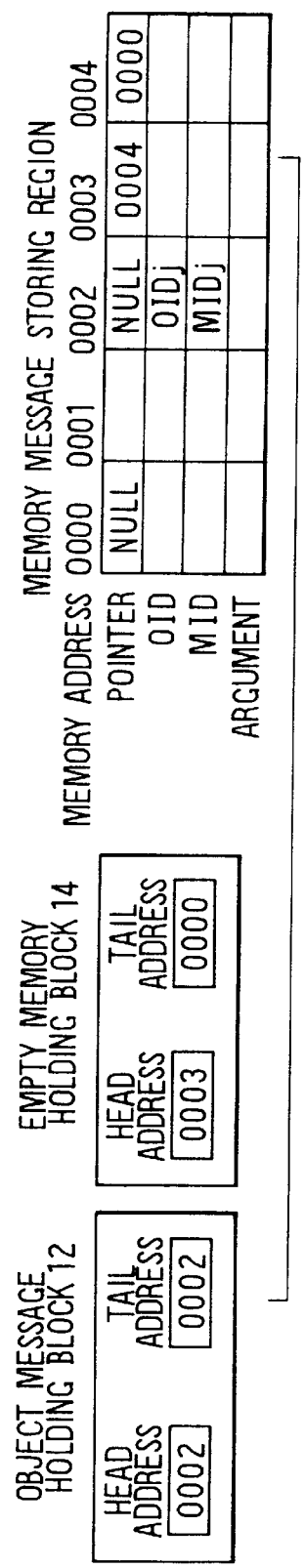
Figure 15C:
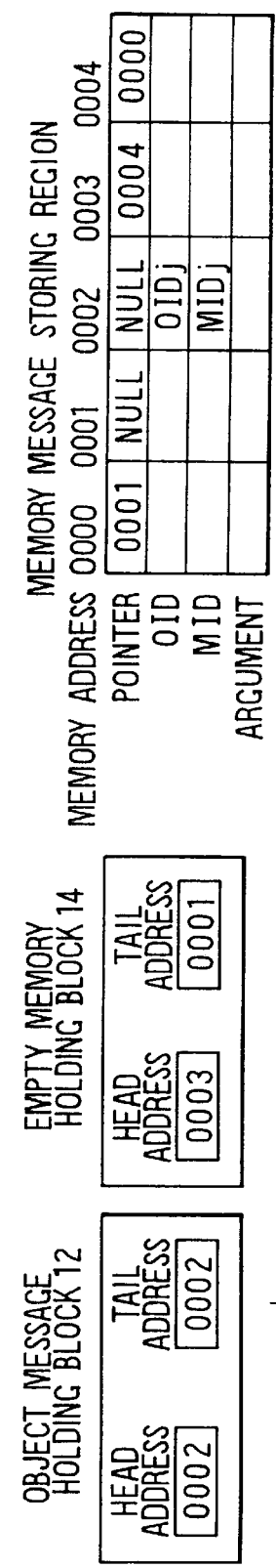

Referring to FIG. 14 and FIG. 15, the manner in which messages are delivered, and how memory blocks are released and secured by message delivery processing will be explained.

FIG. 14 is an example wherein at first, as shown in FIG. 14A, the memory blocks of memory addresses 0000, 0001, 0002 are message blocks, and the memory blocks of memory addresses 0003, 0004 are empty memory blocks. FIG. 15 is an example wherein at first, as shown in FIG. 15A, the memory blocks of memory addresses 0001, 0002 are message blocks and the memory blocks of memory addresses 0003, 0004, 0000 are empty memory blocks. Here OID h, i, j and MID h, i, j are the OIDs and MIDs of the messages.

Initially, if a message is queued in the object message holding part 12, the value of the counter C indicating the number of queued messages is decremented by one, and becomes the same value as the number of messages that will be queued after the message delivery processing (C=2 in the example shown in FIG. 14. C=1 in the example shown in FIG. 15) (S210: YES, S220).

Next, as shown in FIG. 14B and FIG. 15B, the memory block of the memory address stored as the head address in the object message holding part 12 is selected (the memory block whose memory address is 0000 in the example shown in FIG. 14, 0001 in the example shown in FIG. 15), and the memory address of the next memory block (0001 in the example shown in FIG. 14, 0002 in the example shown in FIG. 15) in the object message holding part 12 is stored therein as the head address, and the pointer of the acquired memory block is deleted (S230).

The OID and MID stored in the acquired memory block (OIDh, MIDh in FIG. 14, OIDi, MIDi in FIG. 15) are then read, the content of the message is deleted, the memory address of the newly secured memory block (0000 in FIG. 14, 0001 in FIG. 15) is written to the pointer of the memory block that had previously been the tail address (the memory block whose memory address is 0004 in FIG. 14, 0000 in FIG. 15), and NULL is written to the pointer of the newly secured memory block. In addition, the memory block having become an empty memory block (the memory block whose memory address is 0000 in FIG. 14, 0001 in FIG. 15), so that it is at the end of the message blocks in the empty memory block holding part 14, has its memory address stored as the tail address in the empty memory block holding part 14 (S240).

Finally, the address of the method of the object corresponding to the message content read from the message block is read out, the method is called, and execution is started (S250, S260).

Thus, as shown in FIGS. 14 and 15, the number of empty memory blocks secured in the empty memory block holding part 14 increases by one, and the number of message blocks secured in the object message holding part 12 decreases by one. Also, the message block whose order of release initially was second in the object message holding part 12 (the memory block whose memory address is 0001 in FIG. 14, 0002 in FIG. 15), becomes the head empty memory block.

As examples of queuing and delivery of queued messages FIG. 11, FIG. 12, FIG. 14, FIG. 15 were shown. However, it should be appreciated that the number and the memory addresses of message blocks are not limited thereto, and the number and the release order of memory blocks determined in the program change based on the manner in which the exchange of messages was conducted in the foregoing message queuing and message delivery processing. That is, the above examples were given to specifically explain the present invention. More specifically, the examples were given to show that the memory block of the memory address stored as the head address in the object message holding part 12 (or the empty memory block holding part 14) (the memory block released first among the memory blocks secured in the respective holding part) is acquired, and, after a message is written, read or deleted, it is registered as the tail address in the empty memory block holding part 14 (or the object message holding part 12).

Further, when debug processing is carried out with the debug tool 7 of FIG. 1, because the flag DEBUG is ON, count processing of the number of messages queuing is carried out, and the maximum value Cmax of the queued number is obtained.

When predetermined debug processing has finished, the debug tool 7 reads the maximum value Cmax value from the RAM 6 and reflects the read value in a memory block number specification location in the program.

Next, referring to FIGS. 16–25, explanation will be given on how the objects OB1–OB5 for idling speed control shown in FIG. 2 carry out inter-object message communication via the message delivery control part 10 and how the processing shown in FIG. 3 is carried out.

As shown in FIG. 16, the ISC object OB1 has an idling throttle setting start request method (FIG. 18) executed along with a message (1, 2). In other words, this message has an OID of 1 and an MID of 2, and constitutes the throttle setting start request message shown by [1] of FIG. 3, a water temperature acquisition response method (FIG. 19) executed along with a message (1, 3) constituting the water temperature acquisition response message shown by [7] of FIG. 3, and an engine speed acquisition response method (FIG. 20) executed along with a message (1, 4) constituting the engine speed acquisition response message shown by [5] of FIG. 3.

The water temperature sensor object OB2 has a water temperature acquisition request method (FIG. 21) executed along with a message (2, 1) constituting the water temperature acquisition request message shown by [2] in FIG. 3 and a water temperature A/D value acquisition response method (FIG. 22) executed along with a message (2, 2) constituting the water temperature A/D value acquisition response message shown by [6] in FIG. 3.

In addition, the A/D-converter object OB3 has a water temperature A/D value acquisition request method (FIG. 23) executed along with a message (3, 0) constituting the water temperature A/D value acquisition request message shown by [4] of FIG. 3, the throttle controller object OB4 has a throttle setting request method (FIG. 24) executed along with a message (4, 4) constituting the throttle setting request message shown by [8] of FIG. 3, and the crank sensor object OB5 has an engine speed acquisition request method (FIG. 25) executed along with a message (5, 0) constituting the engine speed acquisition request message shown by [3] of FIG. 3.

Referring to FIG. 16, the execution start addresses of the methods of the objects OB1–OB5 are pre-registered in the connection information database 16 respectively in association with the OIDs and MIDs indicating the indicated methods.

Regarding the processing executed by the CPU 3, the schedule processing of FIG. 17, which is an object other than the objects OB1–OB5 mentioned above and is processing of an object for determining the timing of the idling speed control, is executed every 4 ms. In the following description, it will be assumed that it is debug processing, and that the flag DEBUG is ON. Accordingly, at S140 of the message queuing processing shown in FIG. 10, it will be assumed that an affirmative determination is always made. Further, it will be assumed that this schedule processing is executed after the initialization processing of FIG. 8 is carried out. Finally, it will be assumed that a sufficient number of empty memory blocks are set in the empty memory block holding part 14, and that at S100 of the message queuing processing shown in FIG. 10 an affirmative determination is always made.

As shown in FIG. 17, when execution of the schedule processing is started, at S300, a message transmission request (1, 2) is dispatched. Consequently, the message queuing processing of FIG. 10 described above is executed, and a message (1, 2) is queued in the object message holding part 12. That is, at S110 of FIG. 10, the head empty memory block is acquired from the empty memory block holding part 14. At S120, the message (1, 2) is written into the acquired empty memory block, and, at S130, the memory block into which the message (1, 2) was written is registered as a message block in the object message holding part 12. In such a case, just the message block in which the message (1, 2) was written, is registered in the object message holding part 12. In other words, just one message (1, 2) is stored in the object message holding part 12. Therefore, at S150 the counter C is incremented by one, and because the count value C=1 of the counter C at this time becomes the maximum value, at S180 it becomes the maximum value Cmax=1.

When queuing of the message (1, 2) is finished, execution returns to the schedule processing of FIG. 17, and at S310 of FIG. 17 a message transmission request is dispatched. Thereafter, the message delivery processing of FIG. 13 described above is executed, and the message (1, 2) queued in the object message holding part 12 is delivered.

That is, at S210 of FIG. 13, it is checked whether or not a message is queued in the object message holding part 12, and because only the message (1, 2) is queued, after the counter C is decremented by one at S220, at S230, the contents of the message (1, 2) are read from the message block at the head of the object message holding part 12. At S240, the empty memory block in which the message (1, 2) had been written is returned to the empty memory block holding part 14 as an empty memory block.

Then, at S250 of FIG. 13, the execution start address A12 (see FIG. 16) of the idling throttle setting start request method of the ISC object OB1 corresponding to the contents of the message (1, 2) thus read is calculated from the connection information database 16, and at S260 that calculated execution start address is called. Thereby, delivery of the message (1, 2) is carried out, and execution of the idling throttle setting start request method shown in FIG. 18 is started.

Figure 18:
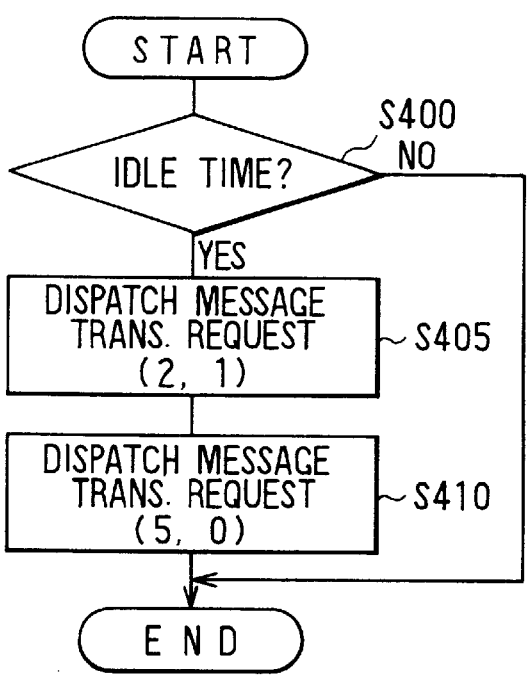
FIG. 18 is a flow diagram showing an idling throttle setting start request method of an ISC object.

As shown in FIG. 18, when execution of the idling throttle setting start request method is started, first at S400, it is determined whether or not the engine is in an idling running state. If it is not, execution of that method is ended, execution of processing returns to the schedule processing of FIG. 17, and all processing ends. However, if the engine is idling, at S405, a message transmission request (2, 1) is dispatched. As a result, the message queuing processing of FIG. 10 is executed, and a message (2, 1) is queued in the object message holding part 12.

That is, at S110 of FIG. 10, the head empty memory block is acquired from the empty memory block holding part 14, and at S120, the message (2, 1) is written into that acquired empty memory block. Further, at S130, the memory block into which the message (2, 1) was written is registered as a message block in the object message holding part 12. In this case, just one message block in which the message (2, 1) was written is registered in the object message holding part 12. In other words, just one message (2, 1) is stored in the object message holding part 12. Therefore, at S150 the counter C is incremented by one, and because the count value C=1 of the counter C at this time becomes the maximum value, at S180 it becomes the maximum value Cmax=1.

When in this way queuing of the message (2, 1) is finished, processing returns to the idling throttle setting start request method of FIG. 18, and at S410 of FIG. 18 a message transmission request (5, 0) is dispatched. Consequently, the message queuing processing of FIG. 10 is executed, and a message (5, 0) is queued in the object message holding part 12.

That is, at S110 of FIG. 10, the head empty memory block is acquired from the empty memory block holding part 14. At S120, the message (5, 0) is written to that acquired empty memory block, and at S130, the memory block into which the message (5, 0) was written is registered as a message block at the tail (in this case, the second from the head) of the blocks in the object message holding part 12.

Then, in the object message holding part 12, the message block in which the message (2, 1) was written and the message block in which the message (5, 0) was written are registered in that order. In other words, messages (2, 1) and (5, 0) are stored in that order in the object message holding part 12. Therefore, at S150 the counter C is incremented by one, and, because the count value C=2 of the counter C at this time becomes the maximum value, at S180 it becomes maximum value Cmax=2.

When in this way queuing of the message (5, 0) finishes, execution of processing returns to the idling throttle setting start request method of FIG. 18. Then, when the processing of this idling throttle setting start request method ends, the message delivery processing of FIG. 13 is executed, and of the two messages queued in the object message holding part 12, the message (2, 1) stored first is delivered.

That is, after the counter C is decremented by one at S220, at S230, the contents of the message (2, 1) are read from the message block at the head of the object message holding part 12. At S240, the message block in which the message (2, 1) had been written is returned to the empty memory block holding part 14 as an empty memory block. Then, at S250, the execution start address A21 (see FIG. 16) of the water temperature acquisition request method of the water temperature sensor object OB2 corresponding to the contents of the message (2, 1) thus read is calculated from the connection information database 16. At S260, that calculated execution start address is called.

Figure 21:
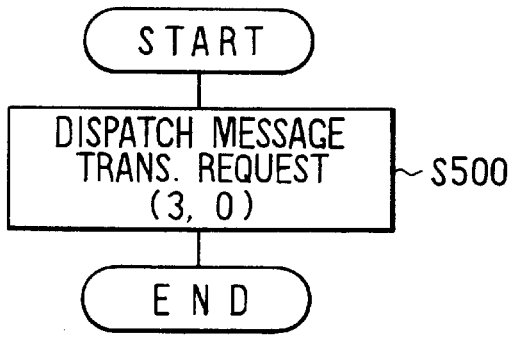
FIG. 21 is a flow diagram showing a water temperature acquisition request method of a water temperature sensor object.

As a result, delivery of the message (2, 1) is carried out, and execution of the water temperature acquisition request method shown in FIG. 21 is started. As shown in FIG. 21, when the execution of the water temperature acquisition request method is started, at S500, a message transmission request (3, 0) is dispatched.

When this happens, the message queuing processing of FIG. 10 is executed, and the message (3, 0) is queued in the object message holding part 12 in exactly the same way as the procedure described above. Then, in the object message holding part 12, the message block in which the message (5, 0) was written and the message block in which the message (3, 0) was written are registered in that order. In other words, two messages, (5, 0) and (3, 0) are stored in the object message holding part 12 in that order. Therefore, at S150 the counter C is incremented by one, and because the count value C of the counter C at this time is 2, the maximum value Cmax is still 2.

When queuing of the message (3, 0) thus finishes, execution of processing returns to the water temperature acquisition request method of FIG. 21. Then, when the processing of this water temperature acquisition request method ends, the message delivery processing of FIG. 13 is executed, and of the two messages queued in the object message holding part 12, the message (5, 0) stored first is delivered.

That is, after the counter C is decremented by one at S220 of FIG. 13, at S230, the contents of the message (5, 0) are read from the message block at the head of the object message holding part 12. At S240, the message block in which the message (5, 0) had been written is returned to the empty memory block holding part 14 as an empty memory block. Then, at S250, the execution start address A50 (see FIG. 16) of the engine speed acquisition request method of the crank sensor object OB5 corresponding to the contents of the message (5, 0) thus read is calculated from the connection information database 16 and, at S260, that calculated execution start address is called. Delivery of the message (5, 0) is carried out, and execution of the engine speed acquisition request method shown in FIG. 25 is started.

Figure 25:
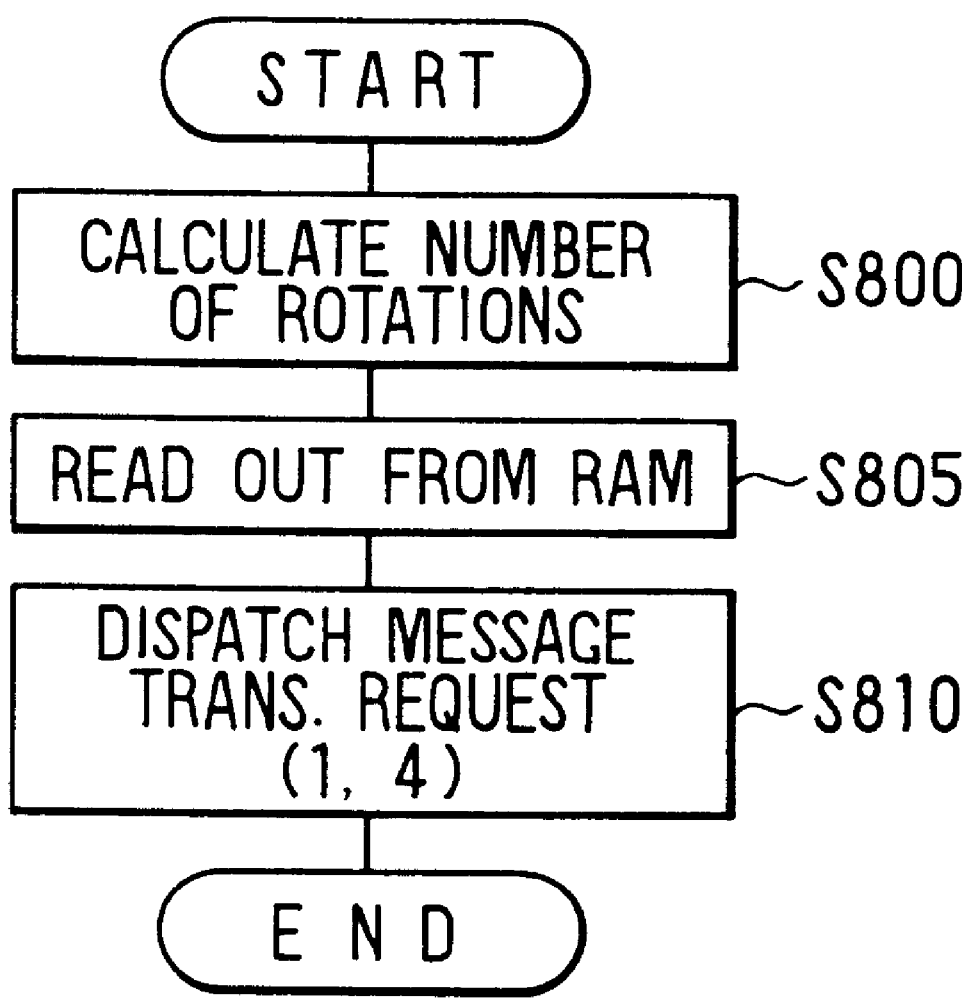
FIG. 25 is a flow diagram showing an engine speed acquisition request method of a crank sensor object.

As shown in FIG. 25, when execution of the engine speed acquisition request method is started, at S800, an engine speed is calculated based on the signal from the crank sensor. Then, at S805, the engine speed calculated at S800 is saved in the RAM 6, and at S810, a message transmission request (1, 4) is dispatched.

When this happens, the message queuing processing of FIG. 10 is executed in exactly the same way as the procedure described above, and the message (1, 4) is queued in the object message holding part 12. Then, in the object message holding part 12, the message block in which the message (3, 0) was written and the message block in which the message (1, 4) was written are registered in that order. In other words, two messages, (3, 0) and (1, 4) are stored in that order in the object message holding part 12. Therefore, at S150 the counter C is incremented by one, and because the count value C of the counter C at this time is 2, the maximum value Cmax is still 2.

When in this way queuing of the message (1, 4) finishes, processing returns to the engine speed acquisition request method of FIG. 25. Then, when the processing of the engine speed acquisition request method ends, the message delivery processing of FIG. 13 is executed, and of the two messages queued in the object message holding part 12, the message (3, 0) stored first is delivered.

That is, after the counter C is decremented by one at S220 of FIG. 13, at S230, the contents of the message (3, 0) are read from the message block at the head of the object message holding part 12. At S240, the message block in which the message (3, 0) had been written is returned to the empty memory block holding part 14 as an empty memory block. At S250, the execution start address A30 (see FIG. 16) of the water temperature A/D value acquisition request method of the A/D-converter object OB3 corresponding to the contents of the message (3, 0) thus read is calculated from the connection information database 16. At S260, the calculated execution start address is called. Thus, delivery of the message (3, 0) is carried out, and execution of the water temperature A/D value acquisition request method shown in FIG. 23 is started.

Figure 23:
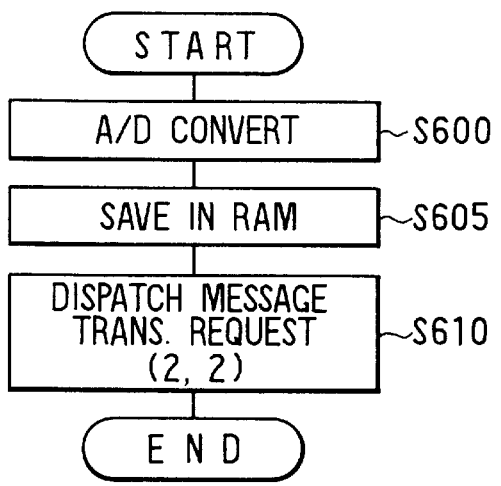
FIG. 23 is a flow diagram showing a water temperature A/D value acquisition request method of an A/D-converter object.

As shown in FIG. 23, when execution of the water temperature A/D value acquisition request method is started, at S600, the analog signal is converted from the water temperature sensor into a digital value, and at S605 the digital value computed at S600 is saved in the RAM 6. Then, at S610, a message transmission request (2, 2) is dispatched.

As a result, the message queuing processing of FIG. 10 is executed, and the message (2, 2) is queued in the object message holding part 12 in exactly the same way as the procedure described above. Then, in the object message holding part 12, the message block in which the message (1, 4) was written and the message block in which the message (2, 2) was written are registered in that order. In other words, two messages, (1, 4) and (2, 2), are stored in the above order in the object message holding part 12. Therefore, at S150 the counter C is incremented by one, and, because the count value C of the counter C at this time is 2, the maximum value Cmax is still 2.

When in this way queuing of the message (2, 2) finishes, execution of processing returns to the water temperature A/D value acquisition request method of FIG. 23. Then, when the processing of this water temperature A/D value acquisition request method ends, the message delivery processing of FIG. 13 is executed, and of the two messages queued in the object message holding part 12, the message (1, 4) stored first is delivered.

That is, after the counter C is decremented by one at S220 of FIG. 13, at S230, the contents of the message (1, 4) are read from the message block at the head of the object message holding part 12. At S240, the message block in which the message (1, 4) had been written is returned to the empty memory block holding part 14 as an empty memory block. Then, at S250, the execution start address A14 (see FIG. 16) of the engine speed acquisition response method of the ISC object OB1 corresponding to the contents of the message (1, 4) thus read is calculated from the connection information database 16. At S260, the calculated execution start address is called. Consequently, delivery of the message (1, 4) is carried out, and execution of the engine speed acquisition response method shown in FIG. 20 is started.

Figure 20:
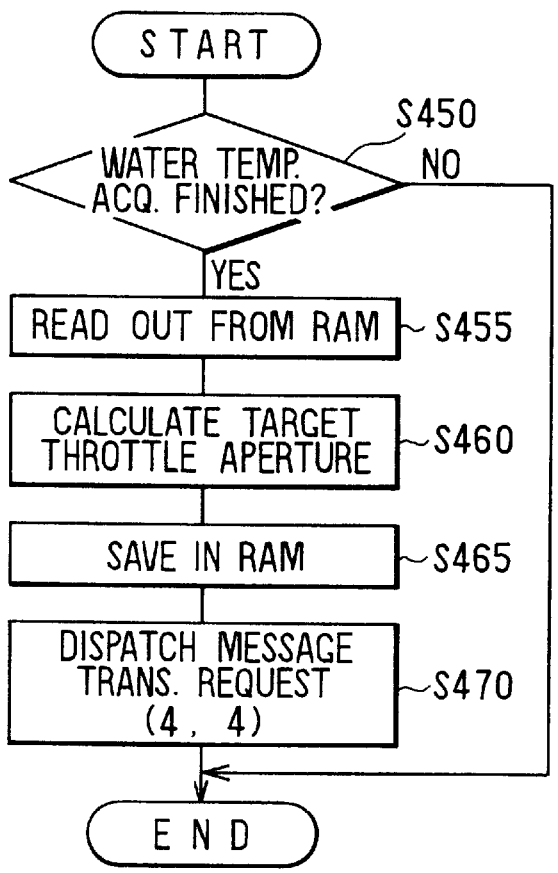
FIG. 20 is a flow diagram showing an engine speed acquisition response method of an ISC object.

As shown in FIG. 20, when execution of the engine speed acquisition response method is started, at S450, it is determined whether or not water temperature acquisition is performed (whether or not a new water temperature value has been saved in the RAM 6).

Here, supposing that water temperature acquisition is performed, at S455, the new engine speed value and water temperature value are read from the RAM 6. At S460, a target throttle aperture for bringing the engine speed to an optimum idling speed is calculated based on the engine speed and water temperature value read at S455. Then, at S465, the target throttle aperture calculated at S460 is saved in the RAM 6, and at S470, a message transmission request (4, 4) is dispatched.

However, at this point in time, because the water temperature A/D value acquisition response method of the water temperature sensor object OB2 for saving the new water temperature value in the RAM 6 has not yet been executed, at S450, it is always determined that water temperature acquisition has not yet been performed. Therefore, the S455–S470 are not performed, and the execution of the engine speed acquisition response method is ended.

When the execution of the engine speed acquisition response method ends, the message delivery processing of FIG. 13 is executed, and the message (2, 2) queued in the object message holding part 12 is delivered.

That is, because only the message (2, 2) is queued, after the counter C is decremented by 1 at S220 of FIG. 13, at S230, the contents of the message (2, 2) are read from the message block at the head of the object message holding part 12. At S240, the message block in which the message (2, 2) had been written is returned to the empty memory block holding part 14 as an empty memory block. At S250, the execution start address A22 (see FIG. 16) of the water temperature A/D value acquisition response method of the water temperature sensor object OB2 corresponding to the contents of the message (2, 2) thus read is calculated from the connection information database 16. At S260, that calculated execution start address is called. Thereby, delivery of the message (2, 2) is carried out, and execution of the water temperature A/D value acquisition response method shown in FIG. 22 is started.

Figure 22:
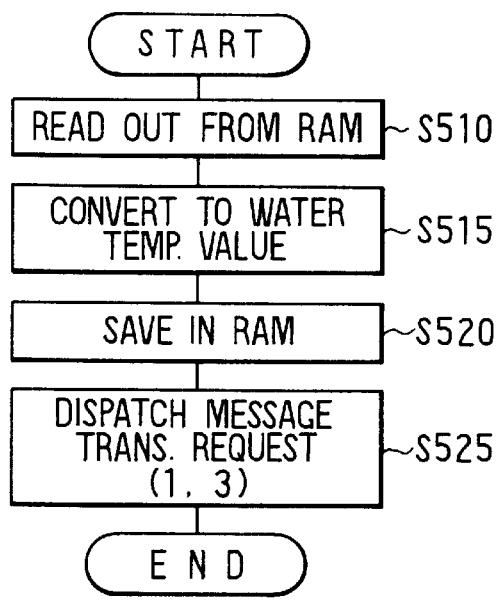
FIG. 22 is a flow diagram showing a water temperature A/D value acquisition response method of a water temperature sensor object.

As shown in FIG. 22, when execution of the water temperature A/D value acquisition response method is started, at S510, the digital value saved in the RAM 6 at S605 of the water temperature A/D value acquisition request method (FIG. 23) is read out, and at S515, computation converting the digital value read out at S510 into a water temperature value ( C) is carried out.

At S520, the water temperature value computed at S515 is saved in the RAM 6, and at S525, a message transmission request (1, 3) is dispatched.

When this happens, the message queuing processing of FIG. 10 is executed, and the message (1, 3) is queued in the object message holding part 12 in exactly the same way as the procedure described above. Then, in the object message holding part 12, just the one message block in which the message (1, 3) was written is registered. In other words, only the one message (1, 3) is stored in the object message holding part 12. Therefore, at S150 the counter C is incremented by one, and, because the count value C=1 of the counter C at this time is not the maximum value, the maximum value Cmax remains 2.

When in this way queuing of the message (1, 3) finishes, execution of processing returns to the water temperature A/D value acquisition response method of FIG. 22. Then, when the processing of this water temperature A/D value acquisition response method ends, the message delivery processing of FIG. 13 is executed, and the message (1, 3) queued in the object message holding part 12 is delivered.

That is, after the counter C is decremented by one at S220 of FIG. 13, at S230, the contents of the message (1, 3) are read from the message block at the head of the object message holding part 12. At S240, the message block in which the message (1, 3) had been written is returned to the empty memory block holding part 14 as an empty memory block. At S250, the execution start address A13 (see FIG. 16) of the water temperature acquisition response method of the ISC object OB1 corresponding to the contents of the message (1, 3) thus read is calculated from the connection information database 16. At S260, the calculated execution start address is called. Thereby, delivery of the message (1, 3) is carried out, and execution of the water temperature acquisition response method shown in FIG. 19 is started.

Figure 19:
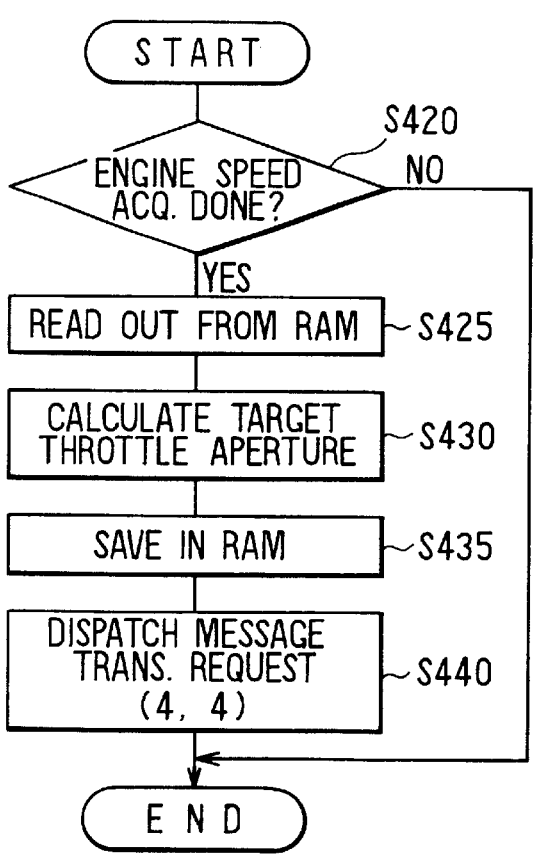
FIG. 19 is a flow diagram showing a water temperature acquisition response method of an ISC object.

As shown in FIG. 19, when execution of the water temperature acquisition response method is started, at S420, it is determined whether or not a new engine speed has been saved in the RAM 6.

Here, if the engine speed acquisition is not performed, the water temperature acquisition response method is ended. However, with the present invention, at this point in time, because a new engine speed has been saved in the RAM 6 at S805 of the engine speed acquisition request method (FIG. 25) described above at S420, it is always determined that engine speed acquisition has been performed.

Then, when it is determined that engine speed acquisition has been performed, at S425, the latest engine speed and water temperature value are read out from the RAM 6. At S430, based on the engine speed and water temperature value read out at S425, a target throttle aperture for bringing the engine speed to an optimum idling speed is calculated. Then, at S435, the target throttle aperture calculated at S430 is saved in the RAM 6, and at S440, a message transmission request (4, 4) is dispatched.

When this happens, the message queuing processing of FIG. 10 is executed, and the message (4, 4) is queued in the object message holding part 12 in exactly the same way as the procedure described above. Then, in the object message holding part 12, just the one message block in which the message (4, 4) was written is registered. In other words, only the one message (4, 4) is stored in the object message holding part 12. Therefore, at S150 the counter C is incremented by one, and, because the count value C=1 of the counter C at this time is not the maximum value, the maximum value Cmax remains at 2.

When in this way queuing of the message (4, 4) finishes, processing returns to the water temperature acquisition response method of FIG. 19. Then, when the processing of this water temperature acquisition response method ends, the message delivery processing of FIG. 13 is executed, and the message (4, 4) queued in the object message holding part 12 is delivered.

That is, after the counter C is decremented by one at S220 of FIG. 13, at S230, the contents of the message (4, 4) are read from the message block at the head of the object message holding part 12. At S240, the message block in which the message (4, 4) had been written is returned to the empty memory block holding part 14 as an empty memory block. At S250, the execution start address A44 (see FIG. 16) of the throttle setting request method of the throttle controller object OB4 corresponding to the contents of the message (4, 4) thus read is calculated from the connection information database 16. At S260, the calculated execution start address is called. Thereby, delivery of the message (4, 4) is carried out, and execution of the throttle setting request method shown in FIG. 24 is started.

Figure 24:
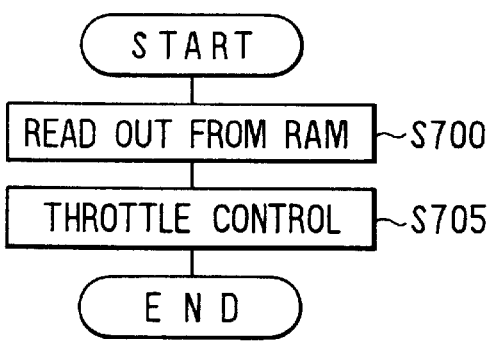
FIG. 24 is a flow diagram showing a throttle setting request method of a throttle controller object.

As shown in FIG. 24, when execution of the throttle setting request method is started, at S700, the target throttle aperture saved in the RAM 6 at S435 of the water temperature acquisition response method (FIG. 19) is read out. At S705, throttle control adjusting the aperture of the throttle valve to the above-mentioned target throttle aperture is carried out. Then, after the throttle control of S705 is carried out, the throttle setting request method ends.

When this happens, the message delivery processing of FIG. 13 is carried out, and at S210, it is determined whether or not a message is queued in the object message holding part 12. In the present case, because there are no more queued messages, processing returns to the message reception waiting state, and then returns to the schedule processing of FIG. 17. When the schedule processing ends, all processing ends.

Because the predetermined debug processing has ended, the debug tool 7 of FIG. 1 reads the Cmax value from the RAM 6 and reflects the read value in a memory block number specification location in the program.

In the example described above, Cmax=2. Because it is known that the memory block number specification location in the program is rewritten to a value of 2 or higher, if two memory blocks are provided the processing described above can be carried out in an error-free manner. Therefore, it is possible to effectively secure memory blocks.

Thus, the methods of the objects OB1–OB5 are executed in the order of: [1] the idling throttle setting start request method (FIG. 18) of the ISC object OB1; [2] the water temperature acquisition request method (FIG. 21) of the water temperature sensor object OB2; [3] the engine speed acquisition request method (FIG. 25) of the crank sensor object OB5; [4] the water temperature A/D value acquisition request method (FIG. 23) of the A/D-converter object OB3; [5] the engine speed acquisition response method (FIG. 20) of the ISC object OB1; [6] the water temperature A/D value acquisition response method (FIG. 22) of the water temperature sensor object OB2; [7] the water temperature acquisition response method (FIG. 19) of the ISC object OB1; and [8] the throttle setting request method (FIG. 24) of the throttle controller object OB4. Processing for idling speed control is carried out in the order shown in the message sequence diagram of FIG. 3.

In the ECU 1 of the present invention, when the ignition switch has been turned on from the off state and an initialization request such as a reset applied to the microcomputer is generated, the initialization processing of FIG. 8 is executed, and memory storage area (empty memory blocks) is secured exclusively for storage of messages (queuing) in the empty memory block holding part 14. Object-dispatched messages (message transmission requests) are stored and secured in the object message holding part 12. Then a message stored in the object message holding part 12 is read out, and processing shifts to execution of the method of the object that is the output destination of the read-out message.

Therefore, with the ECU 1 of this embodiment, the methods of the objects can be executed at a high operating speed. Furthermore, because only messages are stored in a storage area (empty memory blocks) secured exclusively therefore, the capacity that should be secured is easy to estimate, thereby making it possible to minimize memory requirements.

With the ECU 1 of the present invention, the amount of memory necessary during system maintenance is initially secured, are managed on the message delivery control part 10, and are actively operated therein. By thus utilizing memory with a management method that does not depend on the OS, the degree of independence from the OS increases, thereby making it possible to eliminate overhead applied to system calls to the OS.

In addition, a message stored in the object message holding part 12 is read, processing starts at the method of the object that is the output destination of that read-out message, and the read-out message is deleted from the object message holding part 12. More specifically, the memory block of the object message holding part 12 in which the read-out message had been written has its contents deleted and is returned to the empty memory block holding part 14. Consequently, it is possible to prevent unnecessary messages from remaining in the message storing means, thereby further minimizing memory requirements.

With the ECU 1 of the present invention, the message queuing processing of FIG. 10 is executed, a message is stored (queued) in the object message holding part 12. When execution of a method of one of the objects has finished, the message delivery processing of FIG. 13 is executed, the contents of the message stored in the object message holding part 12 are read out, and a shift is made to execution of the method of the object that is the output destination of the read-out message. As a result, the object methods can be executed in real time. In other words, it is possible for the object methods to be executed in an event-driven fashion.

With the ECU 1 of the present embodiment, in the initialization processing of FIG. 8, a decided number of unit storage areas (empty memory blocks) with a memory capacity determined in correspondence with the data size of the messages are secured in the empty memory block holding part 14. By the message queuing processing shown in FIG. 10, when one message has been delivered, one empty memory block is acquired from the empty memory block holding part 14, and the message contents are written. By this means, because it is possible to predict and set the maximum number of messages that will be stored at once, the number of memory blocks required to be secured can be easily determined.

With a conventional method based on function calls, when nesting occurs, as the number of nestings increases, the required amount of memory increases. Therefore, there is a need to secure a large amount of memory; however, with the present invention, it is possible to secure this memory with empty memory blocks only.

With the ECU 1 of the present invention, an OID (object identification number) and an MID (method identification number) constituting identification codes indicating the object and method of the output destination are included in a message dispatched by execution of a method of an object.

Also, the object message holding part 12 stores an OID and an MID in a memory block. Through the message delivery processing shown in FIG. 13, a shift is made to execution of the method of the object shown by the read-out identification codes. Consequently, because the messages stored in the memory blocks become fixed-format, the number of memory blocks that should be secured can be reduced.

Further, with the object message holding part 12 and the empty memory block holding part 14, memory management can easily be carried out independently without relying on system call execution of securing and releasing of system-provided general-purpose memory.

With the ECU 1 of the present invention, during debugging, the number of message blocks queuing in the object message holding part 12 is counted. Then, the largest value queued at once during debugging is obtained. From this value, the number of empty memory blocks secured in the empty memory block holding part 14 in the initialization processing of FIG. 8 is determined. Because it is possible to obtain the maximum message block queuing number by debug processing, obtaining the number of memory blocks that should be pre-secured is simplified.

In the ECU 1 of present invention, during debugging, the number of message blocks queuing in the object message holding part 12 is counted, the largest value queued at once during debugging is obtained, and from this, the number of empty memory blocks secured in the empty memory block holding part 14 in the initialization processing of FIG. 8 is determined. However, the number of empty memory blocks secured in the empty memory block holding part 12 may be alternatively determined by counting the number of empty memory blocks (FIGS. 26 and 27).

Figure 26:
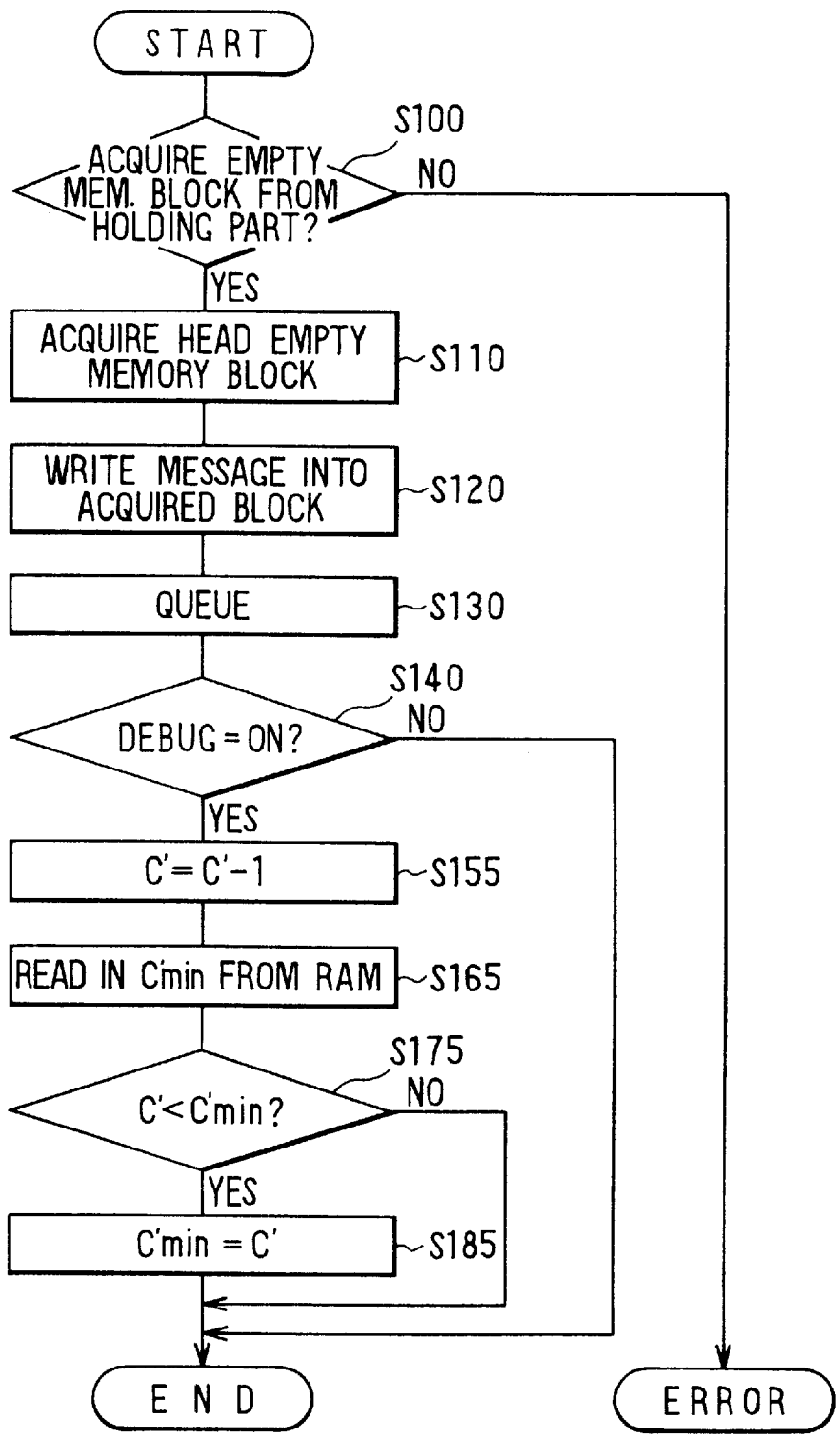
FIG. 26 is a flow diagram showing another example of message queuing processing of a message delivery control part.

In detail, as shown in FIG. 26, after message queuing processing (S140) has ended, if debugging is in progress, a counter C' counting the number of empty memory blocks is decremented by one (S140; YES, S155). Then a C'min value is read in from RAM (S165). If the counter C' is smaller than C'min, then C'min is rewritten to the value of the counter C' (S175; YES, S185).

Figure 27:
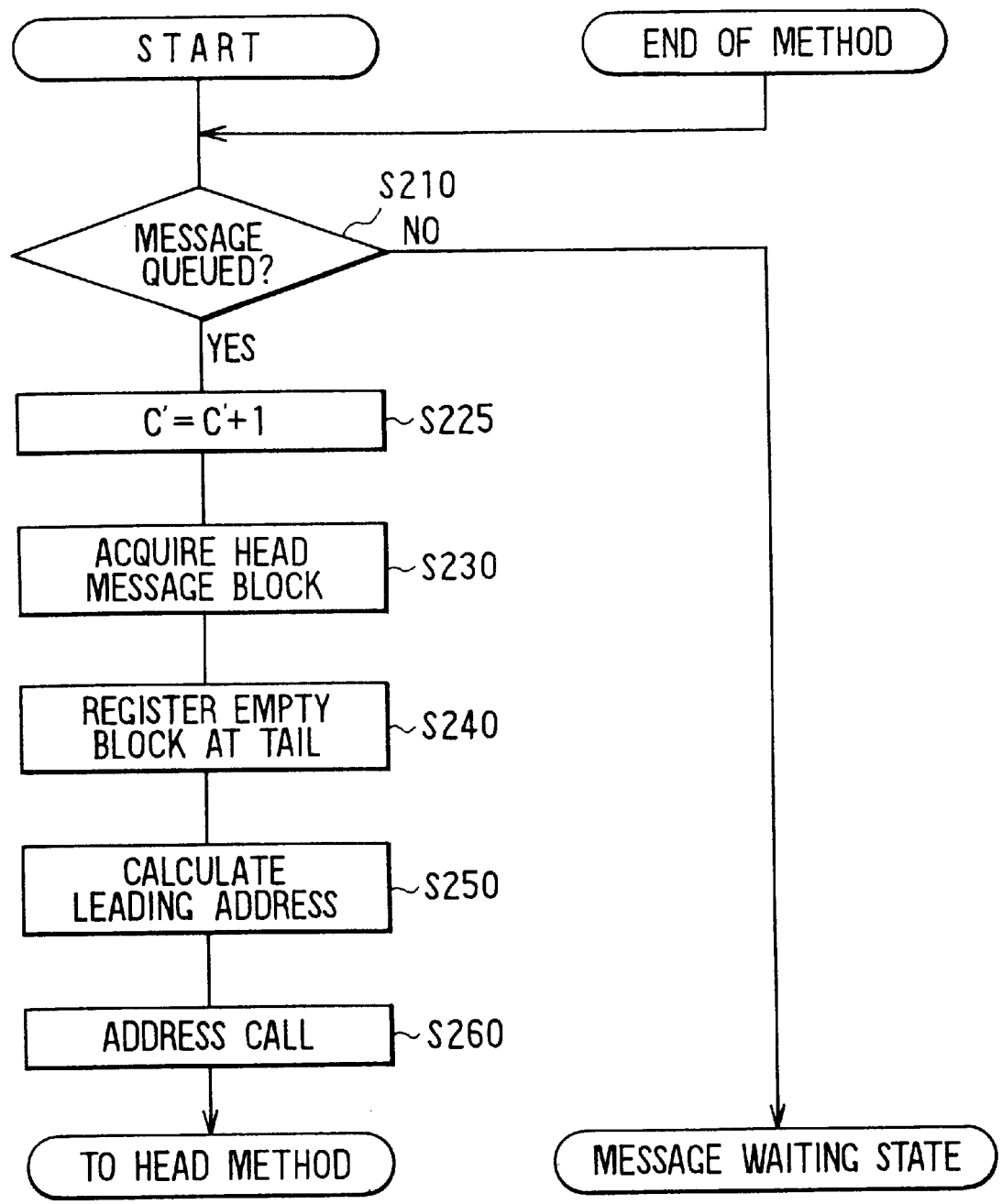
FIG. 27 is a flow diagram showing another example of message delivery processing of a message delivery control part.
Figure 28:
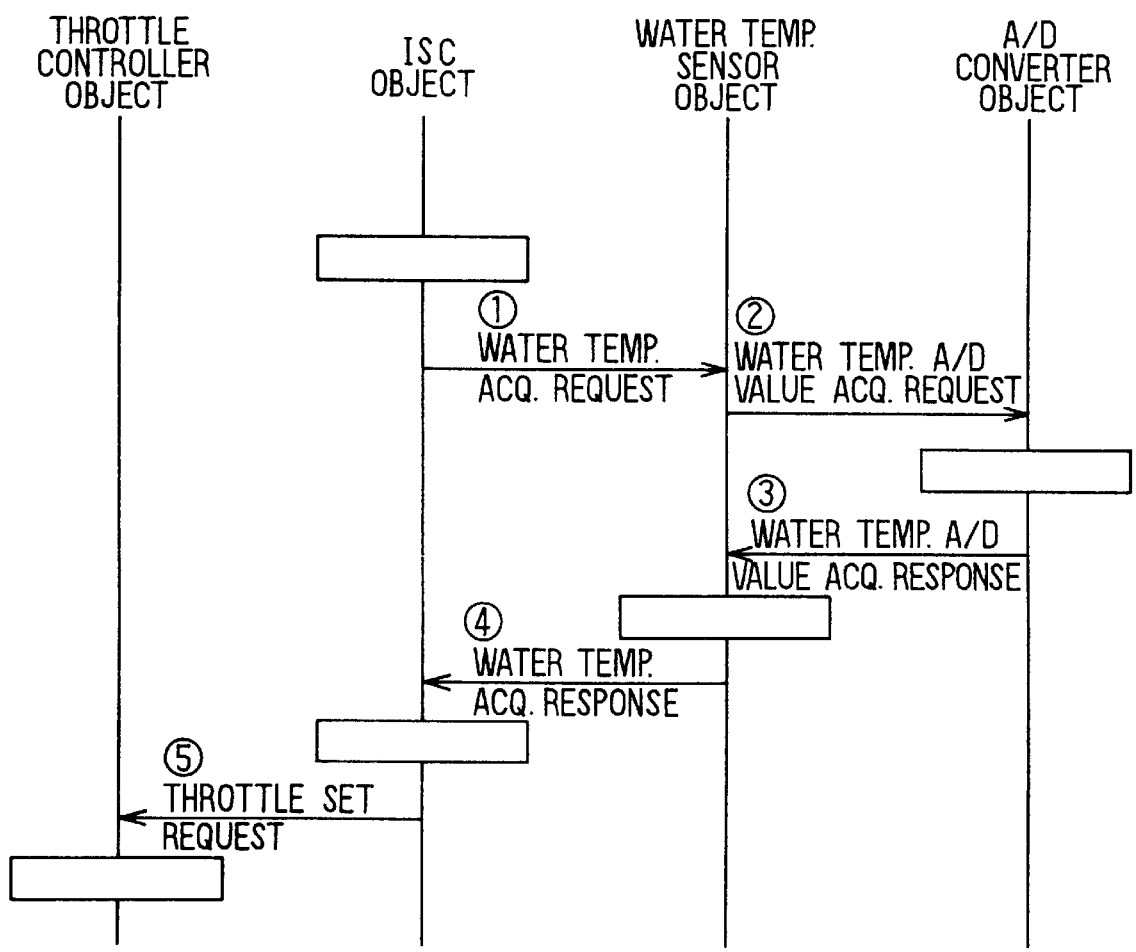
FIG. 28 is a prior art message sequence diagram explaining an example of an object-oriented based program.
Figure 29:
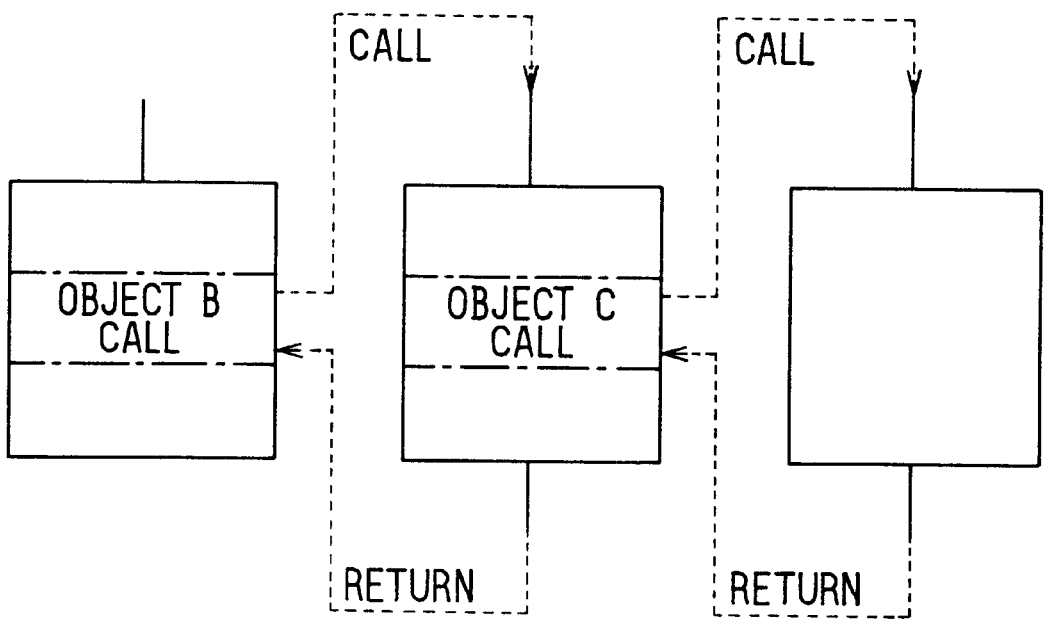
FIG. 29 is an explanatory diagram for explaining a problem associated with a prior art function call method being applied to inter-object message communication.

As shown in FIG. 27, before a message block is acquired (S230), the counter C' is incremented by one (S225). Thus, during debugging, in the same way as counting the number of message blocks queuing in the object message holding part 12, because it is possible to obtain the maximum number of queued message blocks by debug processing, obtaining the number of memory blocks that should be pre-secured is simplified.

In FIGS. 26 and 27, steps whose step numbers are the same as FIGS. 10 and 13 respectively perform similar processing.

In the embodiment described above, all of the objects are stored in a single ROM 5. When the objects are held on a plurality of ROMs, as holding position information in the connection information database 16, information of what execution start address of what ROM should be stored.

On the other hand, in the embodiment described above, an identification number is given to each object and to each method. However, it is also possible to utilize only one identification number.

On the other hand, in the embodiment described above, when the ignition switch is turned on from the off state, or when a reset is applied to the microcomputer, an initialization processing request is generated, and the initialization processing of FIG. 8 is carried out. However, this processing may alternatively be carried out not later than immediately before the beginning of message queuing. That is, if the memory area exclusively for messages can be secured not later than when the message queuing processing is started, the effects of the present invention can be obtained.

On the other hand, in the embodiment described above, after a message is delivered from the object message holding part 12 to an object, when the memory block is secured to the empty memory block holding part 14, the pointer of the memory block of the memory address that had until present been stored as the tail address in the empty memory block holding part 14 is rewritten from NULL to the memory address of the released memory block. Also, NULL is written to the pointer of the newly secured memory block, and the memory address of the newly secured memory block is stored as the tail address in the empty memory block holding part 14. However the memory block that the object message holding part 12 released can alternatively be secured without being secured as the tail address (to become, for example, the head address).

Although the ECU 1 of the embodiment described above is for controlling a vehicle engine, the present invention can be applied in exactly the same way to electronic control units for controlling other control objects, such as for example an automatic transmission or vehicle suspension.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. An electronic control unit, comprising:
    a plurality of means for unit processing that, in accordance with an object of a program subdivided into respective unit functions for controlling a control target, perform processing to realize said respective unit functions, any one of said plurality of unit-processing means being selectively initiated as a receiving unit processing means to perform a processing task after receiving a message from a requesting unit processing means requesting performance of the processing task;
    means for storing said message issued by said requesting unit processing means; and means for reading said message stored in said storing means at a time when any one of said plurality of unit processing means has completed a processing task, and that causes said receiving unit-processing means to commence the requested processing task.

2. The electronic control unit of claim 1, wherein said reading means deletes said read message from said storing means.

3. The electronic control unit of claim 1, wherein said storing means can store a plurality of messages; and said reading means reads an initially stored message among said plurality of stored messages stored in said storing means at a time when any one of said plurality of unit processing means has completed a processing task, causes said receiving unit processing means to commence the requested processing task, and deletes said read message from said storing means.

4. The electronic control unit of claim 1, wherein said message includes an identification code indicating an object corresponding to said receiving unit processing means;

said reading means also includes a storage location for storing said identification code and information indicating a storage location in said storing means of said object indicated by said identification code;

said reading means causing said receiving unit processing means to commence said processing task by specifying the object storage location indicated by said identification code included in said message read from said storing means.

5. The electronic control unit of claim 4, wherein said storage location information is an address indicating a memory region of said storing means.

6. The electronic control unit of claim 1, wherein said message storing means is for securing a storage area for storing said message and other like messages by securing a predetermined number of memory blocks having a predetermined storage capacity based on an amount of data in said message.

7. The electronic control unit of claim 6, wherein said reading means is for counting a number of memory blocks in which no messages are stored;

said reading means further for storing a smallest value among the counted number while predetermined processing is carried out, and, after the predetermined processing ends, for reading out said stored smallest value to determine a capacity of said secured storage area in correspondence with said read-out value.

8. The electronic control unit of claim 6, wherein said reading means, while carrying out predetermined processing, is for counting a number of messages stored in said storing means, and for storing a largest value among the counted number while the predetermined processing is carried out;

said reading means, after the predetermined processing ends, further for reading out the stored largest value, and for determining a capacity of said secured storage area in correspondence with the read-out value.

9. The electronic control unit of claim 6, wherein said storing means includes a data storing portion for storing message data, and a pointer portion for storing memory block queuing information associated with said stored message data.

10. The electronic control unit of claim 9, wherein message data stored at an Nth memory block address in said data storing portion is associated with memory block queuing information at an (N+1)th memory block address in the pointer portion.

11. The electronic control unit of claim 10, wherein a null indicator is stored at the (N+1)th memory block address in the pointer portion if a tail position memory block is located at the (N)th memory block address position.

12. The electronic control unit of claim 9, wherein said storing means further includes an object message storing portion for storing both head and tail memory block address information for object message queuing purposes.

13. The electronic control unit of claim 9, wherein said storing means further includes an empty memory block storing portion for storing both head and tail memory block address information for empty memory block queuing and retrieval purposes.

14. The electronic control unit of claim 13, wherein empty memory block data stored at an Nth memory block address in said data storing portion is associated with memory block queuing information at an (N+1)th memory block address in the pointer portion.

15. The electronic control unit of claim 13, wherein a null indicator is stored at the (N+1)th memory block address in the pointer portion if the (N)th memory block address is a tail position memory block.

16. An electronic control unit, comprising:

a central processing unit that receives sensed system operating signals, and that outputs control signals generated in response to the sensed system operating signals to control a target control function;

a memory associated with the central processing unit that includes a plurality of objects each having at least one unit function, the plurality of objects enabling the central processing unit to control the target control function;

each of the objects being capable of communicating with others of the objects through transmission of object messages; and the central processing unit including a message delivery controller that controls message protocol among the plurality of objects by queuing an object message with other like object messages, and delivering the object message to initiate the at least one unit function based on predetermined controller parameters.

17. The electronic control unit of claim 16, wherein the message delivery controller comprises:

an object message storing portion that receives and stores the object message, along with the other like object messages, in a queue;

a free memory block storage portion that provides memory to the object message storing portion in accordance with message storage requirements; and a connection information database that provides data from the message delivery controller to a receiving object based on database and delivery parameters.

18. The electronic control unit of claim 17, wherein the object message storing portion returns memory used to store the message to the free memory block after the message is delivered to the receiving object.

19. The electronic control unit of claim 17, further comprising a backup memory associated with the message delivery controller that stores data in the object message storing portion and the free memory block storage portion when the electronic control unit receives an off state system signal.

20. The electronic control unit of claim 19, wherein the central processing unit serializes the data from the object message storing portion and the free memory block storage portion before the data is stored in the backup memory.

21. The electronic control unit of claim 17, wherein the object message includes object identification data that identifies the receiving object, and unit function identification data that identifies the unit function to be performed by the receiving object.

22. The electronic control unit of claim 21, wherein the connection information database includes an operation storage portion in which execution start addresses associated with predetermined combinations of the object and unit function identification data are stored.

23. The electronic control unit of claim 17, wherein the message delivery controller is operative to deliver the object message to the receiving object by calling a start address corresponding to the receiving object, and by calling unit function identification data, to initiate delivery of the object message.

24. The electronic control unit of claim 17, wherein said plurality of objects are operative to selectively control a plurality of target control functions.

25. The electronic control unit of claim 17, wherein the message delivery controller delivers said messages with both argument and unit function information.

26. The electronic control unit of claim 17, wherein said message delivery controller is further for counting a number of storage blocks in said free memory block, and for storing a smallest value among the counted number while predetermined processing is carried out, and, after the predetermined processing ends, for reading out said stored smallest value to determine a message storage capacity in correspondence with said read-out value.

27. The electronic control unit of claim 17, wherein said message delivery controller, while carrying out predetermined processing, is for counting a number of messages stored in said object message storage portion, and for storing a largest value among the counted number while the predetermined processing is carried out;

said initializing means, after the predetermined processing ends, further for reading out the stored largest value to determine a message storage capacity in correspondence with the read-out value.

28. The electronic control unit of claim 18, wherein said message delivery controller further comprises a pointer storage portion for storing queue information corresponding to stored object messages.

29. The electronic control unit of claim 28, wherein an object message stored at an Nth address in the object message storing portion corresponds to queue information at an (N+1)th address in the pointer portion.

30. The electronic control unit of claim 29, wherein a null indicator is stored at the (N+1)th address position in the pointer portion if the (N)th address of the object message storing portion is a tail address.

31. The electronic control unit of claim 28, wherein the object message storing portion further includes both head and tail memory address information for object message queuing purposes.

32. The electronic control unit of claim 28, wherein the free memory block storing portion is further for storing both head and tail memory block address information for free memory block queuing and retrieval purposes.

33. The electronic control unit of claim 32, wherein a free memory block at an Nth address in the free memory block storing portion corresponds to queue information at an (N+1)th address in the pointer portion.

34. The electronic control unit of claim 33, wherein a null indicator is stored at the (N+1)th address in the pointer portion in the pointer portion if the free memory block (N)th address is a tail address.

35. A method of controlling a control target through a plurality of objects that each selectively performs a processing task, comprising the steps of:

selectively initializing one of the plurality of objects as a sending object to request performance of a processing task;

issuing a message from the sending object that requests performance of the processing task from a receiving object;

queuing the message sent by the sending object; and delivering the queued message to the receiving object, when any one of the plurality of objects has completed a prior processing task, to cause the receiving object to initiate the requested processing task.

36. The method of claim 35, further comprising the step of deleting the queued message after the step of delivering.

37. The method of claim 36, wherein the step of queuing comprises queuing the message with a plurality of like messages issued from the plurality of objects.

38. The method of claim 37, wherein the step of delivering comprises delivering the plurality of like messages in an order based on the step of queuing.

39. The method of claim 35, wherein the step of queuing comprises the steps of:

storing the message based on object identification and task identification information contained in the message, and in an order of issuance; and identifying a stored start address, corresponding to the object and task identification data, to initiate the step of delivering.

40. The method of claim 35, further comprising the step of sending a message from the receiving object to the sending object indicating completion of the requested processing task.

41. The method of claim 35, further comprising the step of storing pointer information utilized during the step of queuing.

42. The method of claim 41, further comprising the step of providing the pointer information with both head and tail memory address information for use during the step of queuing.

* * * * *